United States Patent

[11] 3,557,317

[72] Inventor Virgle E. Porter
Country Club Hills, Ill.

[21] Appl. No. 735,609
[22] Filed June 10, 1968
[45] Patented Jan. 19, 1971
[73] Assignee Amtron, Inc.
Midlothian, Ill.
a corporation of Illinois

[54] TELEPHONE SWITCHBOARD WITH UNIVERSAL LINE/TRUNK CIRCUITS
55 Claims, 7 Drawing Figs.

[52] U.S. Cl. .......... 179/27
[51] Int. Cl. .......... H04m 3/42
[50] Field of Search .......... 179/18.7Y, 18.19, 27.1, 27.02, 27.01, 27, 18TRK, 27.2, 91, 99, 18DC

[56] References Cited
UNITED STATES PATENTS

| | | | |
|---|---|---|---|
| 3,048,662 | 8/1962 | Haigh et al. .......... | 179/22 |
| 3,384,717 | 5/1968 | Coston .......... | 179/27(.02) |
| 2,516,814 | 7/1950 | Voss .......... | 179/17(.01) |
| 2,883,467 | 4/1959 | Ketchledge .......... | 179/18(.7YA) |
| 2,949,506 | 8/1960 | Abbott et al. .......... | 179/27(.02) |
| 3,055,982 | 9/1962 | Kowalik .......... | 179/27(.02) |
| 3,334,191 | 8/1967 | Arseneau et al. .......... | 179/27(.1) |

*Primary Examiner*—Kathleen H. Claffy
*Assistant Examiner*—Randall P. Myers
*Attorney*—Hume, Clement, Hume & Lee

ABSTRACT: A telephone switchboard includes N line/trunk circuits and M links individually coupled to the N horizontal and M vertical terminals, respectively, of a crosspoint matrix. An incoming call is connected to an allotted one of the links and thence to a called party by control circuitry that effects closure of two crosspoints on a single vertical terminal of the matrix.

An operator automatic answer circuit queues incoming calls in the order of their occurrence and permits the operator to individually access and service these calls with a minimum of effort.

Signaling and indicator circuits utilize positive and negative control signal biases on the connecting matrix talk path to provide various operator informational or control functions.

Selected line/trunk circuits are provided a higher grade of service, i.e., a lesser probability of encountering a busy signal by apparatus which reserves certain of the links for use only by priority status line/trunks. Numerous other features, such as special conference link circuitry, are disclosed.

Inventor
Virgle E. Porter
By Hume, Clement, Hume & Lee
Attorneys

Inventor
Virgle E. Porter

By *Hume, Clement, Hume & Lee*
Attorneys

Inventor
Virgle E. Porter
By Hume, Clement, Hume & Lee
Attorneys

Inventor
Virgle E. Porter
By Hume, Clement, Hume & Lee
Attorneys

Inventor
Virgle E. Porter
By Hume, Clement, Hume & Lee
Attorneys

Inventor
Virgle E. Porter

By Hume, Clement, Hume & Lee
Attorneys

TELEPHONE SWITCHBOARD WITH UNIVERSAL LINE/TRUNK CIRCUITS

INTRODUCTION

The present invention relates generally to telephone switchboards and, more particularly, to a highly automated telephone switchboard that greatly simplifies the task of the operator in handling and completing calls.

The switchboard is further characterized by its exceptional versatility, e.g., selective operation in either an automatic or manual mode, prompt assignment or removal of a priority status for any of the line/trunk circuits etc. and a wide range of other features providing for a better quality and broader range of service to the telephone serviced by the switchboard. A line/trunk circuit is a conventional definition for a circuit which serves a dual function and which is operable as both a line circuit to establish a circuit between a subscriber and a switchboard and as a trunk circuit to establish a circuit between two switchboards.

SUMMARY OF THE INVENTION

In accordance with one object of the present invention, only one crosspoint matrix is employed to extend a call between a pair of line/trunk circuits as opposed to the two matrix (incoming-outgoing) arrangement of prior art telephone switchboards. More particularly, this facet of the invention is directed to a telephone switchboard having a crosspoint matrix of horizontal and vertical terminal dimensions N by M, respectively, with the matrix crosspoint at the intersection of respective horizontal and vertical terminal pairs being adapted for effecting an electrical interconnection of the respective terminal pairs in response to coincident signal markings thereon. N line/trunk circuits and M normally idle link circuits are coupled to individual ones of the vertical and horizontal terminals, respectively, of the matrix. An allotter is adapted to enable an idle one of the links to signal mark its associated vertical matrix terminal and for similarly enabling a successive idle link upon electrical connection of one of the line/trunk circuits to the said one link through the matrix. A seize circuit within a line/trunk is responsive to a predetermined input signal to develop a signal marking on its associated horizontal matrix terminal for thereby closing the matrix crosspoint between the one line/trunk and the one enabled link. A called party is now connected to the said one link as follows. A connect means associated with the called line/trunk, preferably a manually actuable switch on the switchboard display panel, develops a signal marking on the horizontal matrix terminal associated with the called line/trunk while control means, synchronized for operation with the connect means, effectively and temporarily disables the allotter and concurrently reenables only the said one link thereby to close a second crosspoint on the vertical matrix terminal associated with the said one link and complete the call between the two line/trunks.

In accordance with another object of the invention, direct current control biases of a positive and negative polarity (carried between connected links and line/trunks by the matrix talk path) are utilized to conveniently identify the link to which a busy line/trunk is connected and to assign a priority call status or the like to any line/trunks that are connected to a selected link. Specifically, a first signaling means is coupled to selected ones of the M links and is adapted for developing an electrical control signal bias of a first predetermined polarity on the talk path interconnecting a predetermined pair of the N line/trunk circuits. First indicator means, coupled to selected ones of the line/trunk circuits, is responsive to the presence of the electrical control signal bias of the aforesaid first polarity for developing a first predetermined signal indication, such as denoting that the call is not to be preempted or interrupted by the operator.

A second signaling means, coupled to selected ones of the line/trunk circuits, develops an electrical control signal bias of an opposite polarity on the talk path interconnecting a predetermined pair of the line/trunk circuits, the second signaling means being adapted to effectively override the first signaling means. A second indicator means, coupled to selected ones of the links, is responsive to the aforesaid opposite polarity signal bias for providing a second predetermined signal indication, enabling, for example, an operator to identify the link to which a particular line/trunk is connected.

Another object of the invention is to provide an operator automatic answer circuit that queues incoming calls in the order of their occurrence and permits the operator to individually access the incoming calls, identify the party desired to be reached, and complete the call with a minimum of effort. More particularly, this aspect of the invention includes operator access means adapted, upon connection to a service requesting link, i.e., a link to which an incoming call from a line/trunk has been connected, to permit an operator to interrogate the line/trunk coupled to the service requesting link. Service request queueing means are adapted for connecting the operator access means in succession to individual ones of the service requesting links.

A further invention object is to provide selected line/trunk circuits a higher grade of service than the remaining line/trunks. This is accomplished by means of a link priority reserve system that maintains selected links in an idle condition until all remaining links are busy and then releases these links only for calls from priority status line/trunks. The identity and number of line/trunks accorded a priority status as well as the number of links held in reserve are selectable by the operator and may readily be changed.

More specifically, the priority reserve system comprises a priority selector means coupled to a predetermined number of the N line/trunk circuits for effectively assigning a priority status to preselected ones of the line/trunks. A link priority reserve means includes apparatus for effectively assigning a priority status to a predetermined number of the M links and for preventing the allotter from enabling any of the priority links until all of the remaining links are in a busy condition, the priority reserve means further being responsive to the priority selector means for connecting only priority status line/trunk circuits to the priority links.

It is yet a further purpose of the invention to provide a conference link that permits closure of more than two crosspoints on the vertical terminal of the conference link thereby to interconnect a corresponding plurality of line/trunk circuits. Individual conferees are enabled to withdraw from the conference without causing a termination of the call. The operator is given a service request indication upon the withdrawal of any conferee from the call.

The switchboard of the present invention is adapted to respond to telephone handset signals of either a common battery or magnetotype. In this latter instance, and as is well understood in the art, a hand crank is utilized to provide a momentary "ring-on" signal pulse to initiate the call; at completion of the call, the hand crank is again used to develop an identical "ring-off" signal pulse to disconnect the line/trunk from the link. To assure that the operator is enabled to identify whether a party is ringing-on or ringing-off, there is provided means including a bistable memory device within each of the line/trunk circuits and responsive to the first and second momentary input signals for maintaining a busy lamp in a busy indicating condition subsequent to the first momentary input signal and independently of connection of the line/trunk circuit to an interconnect means, i.e., the crosspoint matrix and link that are adapted to interconnect this party and another, and for extinguishing the busy lamp indication only on application of the second momentary input signal to the line/trunk circuit.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several FIGS. of which like reference numerals identify like elements and in which:

DESCRIPTION OF THE PREFERRED EMBODIMENTS

Figure 1:
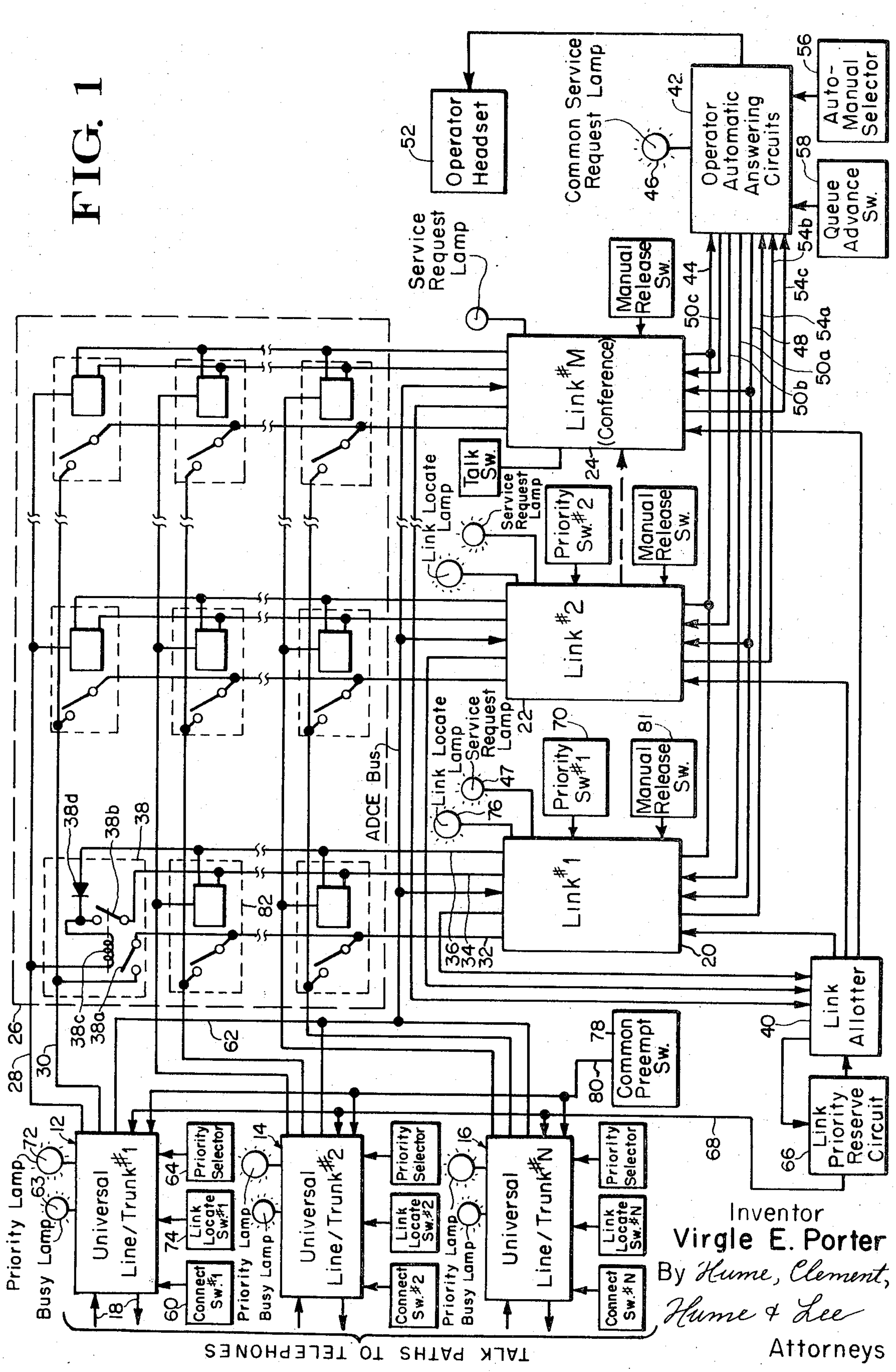
FIG. 1 is a block diagram of a preferred embodiment of the telephone switchboard according to the present invention.

Referring now to FIG. 1, there is illustrated a block diagram of a telephone switchboard having various features according to the present invention. The illustrated switchboard is adapted to be attended by an operator and the lamps and switches pictured in the drawing are conveniently arranged within easy reach and viewing on an operator display panel of the enclosure for the switchboard circuitry. All of the telephones serviced by the switchboard are, of course, located at various remote positions but are connected to an associated line/trunk of the central switchboard by electrically conductive wires. Each telephone is equipped to signal its associated line/trunk, and vice versa, in conventional fashion. Incoming calls are connected by a crosspoint matrix to a link whereat they are accessed and interrogated by the operator to ascertain the identity of the called party. The incoming call is extended by a return path through the crosspoint matrix and the appropriate line/trunk to the telephone of the called party. More particularly, the switchboard comprises a plurality of universal line/trunk circuits each of which may be identical to the representative line/trunk denoted by the reference numeral 12 in the drawing. For convenience and clarity, only two additional line/trunks 14 and 16 are illustrated while the dashed arrow between these latter blocks as well as the line/trunk numbering sequence 1, 2 ... N of indefinite end value is used to denote the fact that there may be 20, 50 or more of such line/trunk circuits, corresponding to the number of telephones serviced by the switchboard. It will also be recognized by those skilled in the art that other switchboards, rather than merely individual telephones, may be connected as inputs to certain of the line/trunks thereby to permit cross-calling between telephones of the respective switchboards.

The representative line/trunk 12 is connected to its associated telephone (not shown) through a bilateral talk path such as a balanced line pair, schematically denoted by the oppositely directed arrows 18 in the drawing. Those telephones located at an extended distance from the switchboard may require conventional hybrid or repeater signal boosting networks at spaced intervals along their connecting wires in which case the input-output arrows 18 are typically a four-wire pair to accommodate bilateral communication. Each line/trunk circuit includes input or seize-ring-release circuit means alternatively responsive to either a conventional common battery or magnetotype telephone signaling to provide an appropriate energizing output signal to its associated crosspoint matrix terminal.

The switchboard also includes a plurality of links 1, 2 ... M, the indefinite numbering sequence and the dashed arrow between the latter two links again denoting that the switchboard may include four, eight or more of such links and that the exact number is dependent purely on the required size of the switchboard installation. Only two call completing links 20, 22 and a conference link 24 are illustrated in the drawing for convenience and clarity. Only one link is utilized in completing a call between a pair of line/trunk circuits. Thus, only half as many links as line/trunks need be provided to avoid any incoming call encountering a link busy signal. From a practical standpoint, even fewer links are generally provided, the exact number being determined by the anticipated call traffic and the quality of service it is desired to accord each telephone.

One or more of the M links, as link 24, may be specially adapted for completing conference calls, i.e., calls between three or more line/trunk circuits. The construction and operation of the conference link is considered in detail in a separate section herein.

Although the designations N and M have been used in the drawing to denote the total number of line/trunks and links, respectively, as well as the corresponding terminal dimensions of the matrix, it is to be understood that these designations as used in the appended claims are intended to generally denote any preselected group of line/trunks and links whether or not the respective groups are equal to the total number of line/trunks and links in the switchboard.

The switchboard also includes a crosspoint matrix 26 which per se is of generally conventional construction having N horizontal and M vertical terminals coupled to individual ones of the line/trunk and link circuits, respectively. As is well understood in the art, there is usually an open circuit at each horizontal-vertical terminal intersection, i.e., matrix crosspoint, but in response to coincident signal markings on a horizontal and a vertical matrix terminal, the crosspoint contacts at the intersection of these terminals are closed and an electrical circuit is completed through the matrix to electrically interconnect a link and a line/trunk. In the present embodiment, each horizontal terminal as, for example, that coupled to line/trunk 12, comprises a pair of electrically conductive leads 28 and 30. On the other hand, each vertical matrix terminal includes three electrically conductive leads such as the leads 32, 34 and 36 coupled to the link 20. Thus, the expression "horizontal terminal" and "vertical terminal" as used herein as well as in the appended claims are intended to generally denote any grouping of one or more electrical leads that cooperatively define the "horizontal" and "vertical" inputs, respective, to a matrix crosspoint element. Of course, the words "horizontal" and "vertical" as used in the present context are well-known terms of art defining a convenient reference frame and these words are not to be interpreted as specifying the relative or absolute angular orientation of the terminals.

The matrix crosspoint adapted to selectively interconnect the line/trunk 12 and the link 20 is represented within the dashed outline 38 in the drawing. The apparatus enclosed by the dashed block 38 is typically contained within a single modular glass reed switch of conventional construction. Each of the remaining crosspoints of the matrix is likewise comprised of a similar reed switch unit. More specifically, the matrix crosspoint switch assembly 38 comprises a pair of normally open contacts 38*a* and 38*b* adapted to be closed upon energization of the coil 38*c*, as denoted in the drawing by the dashed line joining the coil and switch contacts. The switch contact 38*a* is interposed between a horizontal talk path lead 30 of line/trunk 12 and a vertical talk path lead 32 of the link 20; closure of the contact 38*a* provides an electrically conductive "talk path" between the aforesaid link and line/trunk.

Closure of the crosspoint contact 38*a* occurs only in the presence of coincident signal markings on the horizontal control-hold current lead 28 and the vertical control lead 36 resulting in a current flow from line/trunk 12 through the lead 28, the coil 38*c*, a blocking diode 38*d* and the vertical matrix lead 36 to ground. This current flow energizes the coil 38*c* closing the contacts 38*a* and 38*b*. A hold current then flows from the link 20 through the vertical hold current lead 34, closed contact member 38*b*, the energizing coil 38*c* and the control-hold current lead 28 to the line/trunk 12 to maintain the talk path contact 38*a* in a closed condition. A call is terminated by momentarily interrupting the hole current path for the coil 38*c* which in turn causes the contacts 38*a* and 38*b* to open and terminate the talk path connection between the line/trunk 12 and the link 20.

Signal marking of the horizontal matrix terminals associated with each line/trunk is effected by the telephone user picking up the receiver, ringing-on or the like depending, of course, on the type of handset signaling provided. For instance, initiation of a call from the telephone connected to the line/trunk 12 energizes seize circuit means within this line/trunk resulting in a momentary negative output signal on the control lead 28 to signal mark this lead; the act of hanging-up or ringing-off at the conclusion of a call results in an opening of the hold current circuit within the line/trunk and, accordingly, a termination of the connection with a link.

Contra to the random and momentary signal marking of the line/trunks according to the random placement of calls, an allotter means 40 enables only one idle link to signal mark its associated vertical matrix terminal at any one time and maintains that link in a signal marked condition until a line/trunk is connected through the matrix to the enabled link. The allotter 40 then similarly enables a successive idle link. More specifically, the allotter 40 is provided with a series of individual output leads running to respective ones of the links 1, 2 ... M as well as individual input or return leads from the links. The allotter 40 comprises a normally free running clock, i.e., a multivibrator, which increments a conventional binary counter through a repetitive counting cycle. The counter is coupled by a conventional decoder to the individual output leads of the allotter so that the leads are successively and individually energized once each counting cycle thereby enabling the respective links to signal mark their corresponding matrix control leads. When an idle link is encountered by the allotter, the return lead from this link is energized to halt further operation of the clock and maintain the vertical control lead of the link in a signal marked condition.

Thus, an incoming call from any one of the line/trunks 1, 2 ... N is connected to the one enabled link and when such a connection occurs, the inhibiting input from that link to the allotter clock is removed and the clock again increments the counter until a succeeding idle link is encountered. Busy links are bypassed by the allotter since the return lead from the link does not in this case carry a signal to stop the allotter clock.

Once an incoming call is connected to a link, it is necessary for the operator to access the link and determine the identity of the party that the incoming caller desires to reach. According to the present invention, an operator automatic answer circuit 42 enables the operator to automatically service the incoming calls in the order of their occurrence and furthermore to extend each call to the desired line/trunk in a simple and convenient manner. To this end, the circuit 42 includes a link scanning circuit which is similar in construction to the link allotter circuit 40. The link scanning apparatus of the circuit 42 searches for a link that is requesting service i.e., one to which an incoming call has been connected and, upon encountering such a link, the scanning apparatus is stopped until the link is serviced and the call extended to the desired party. The scanning apparatus proceeds through the links in numerical order and since the links are allotted in this same order, a queueing of incoming calls in the order of their occurrence is inherently maintained except in a comparatively rare circumstance where the allotter "laps" the scanning apparatus.

The answering circuit 42 is provided with a number of input and output leads running respectively from and to the various links as denoted in the drawing by the arrows. More particularly, a common service request lead 44 from all of the links carries an input signal to the answering circuit 42 whenever at least one of the links is in a service request condition. The presence of a signal on the lead 44 causes, among other things, a common service request lamp 46 to glow thereby notifying the operator that at least one link is in a service request condition. The use of a common request lamp avoids the necessity of monitoring a field of lamps and has been found less fatiguing and more convenient for the operator. However, to accommodate a manual mode of operation each of the links is provided with an individual service request lamp, as lamp 47 of the link 20.

An operator talk bus 48 is coupled from the answering circuit 42 in common to each of the links. A series of talk control leads, of which three 50*a*—*c* are illustrated in the drawing, are coupled to respective ones of the links. Only one of the talk control leads is able to be energized at any one time so that the operator talk bus 48 is able to be effectively connected to only a corresponding one of the links. The transmit and receive portions of an operator headset 52 are connected by the answering circuit 42 to the talk bus 48 permitting the operator to converse with a party or parties connected to a selected one of the links.

The answering circuit 42 is also provided with a series of individual input leads extending from respective ones of the links. Again, only three of these leads 54*a*—*c* are illustrated in the drawing. The input leads 54*a*—*c* are energized when their respective links are in a service request condition. The leads 54*a*—*c* are connected to the link scanning apparatus of the automatic answering circuit and, in conjunction with the signals carried by the output leads 50*a*—*c* provide for an automatic accessing of the incoming calls in the order of their occurrence.

Assuming the operator has selected the automatic mode via a mode selector switch 56 (a manual accessing of incoming calls is well-known in the art and will not be discussed in detail herein), an initial actuation of a queue advance switch 58 connects the operator through his headset 52 to the link to which the first of the incoming calls was connected. The operator is enabled to converse with the caller and determine the identity of the party desired to be reached. The call is then completed in a manner presently to be described. A second actuation of the switch 58 disconnects the operator from the first link and, assuming more incoming calls are awaiting service, the answer circuit directly steps to the link of the succeeding call. A third actuation of the switch 58 is required to connect the operator to another service requesting link if there is a time hiatus between incoming calls. This manner of operation is desired so that the operator may stay with each call even subsequent to its completion if so desired, and provide any additional assistance that the calling or called party may require.

In accordance with the present invention, the crosspoint matrix network 26 is utilized both to connect an incoming call to a link and to connect the same link to the line/trunk circuit of the called telephone. The manner in which the former function (incoming call to link) is attained is discussed earlier herein; with regard to the latter (link to called telephone), each of the line/trunk circuits is provided with a manually actuable connect switch identical to a connect switch 60 of the line/trunk 12. Actuation of the switch 60, among other things, energizes an allot disable connect enable (ADCE) bus 62 that is connected in common from all of the line/trunks to all of the links. As indicated by its name, the energized bus 62 effectively prevents the allotter 40 from enabling any of the links to signal mark their associated matrix terminals while concurrently enabling the link to which the operator is then connected by the answer circuit 42.

Actuation of the connect switch 60 also coincidentally energizes the matrix control lead 28 thus providing momentary and concurrent signal markings on the horizontal lead 28 and the vertical lead 36 resulting in an electrical interconnection of the line/trunk 12 and the link 20 through the closed crosspoint 38 of the matrix 26. Of course, a ring tone is also provided to the called telephone in a conventional fashion by the line/trunk 12. The connection of a line/trunk to a link either as a calling or called party causes a busy lamp of the line/trunk to glow, such as a busy lamp 63 of line/trunk 12. The concurrent signals developed upon depression of the connect switch 60 are of an extremely short duration so that incoming calls are not noticeably delayed.

As will be recalled, the switchboard of the present invention further comprises a priority reserve system for providing selected line/trunk circuits a higher grade of service, i.e., a lesser probability of receiving an all links busy signal, than the remaining line/trunk circuits. To this end, there is provided a priority selector means, preferably a simple toggle switch or the like, such as the selector 64 of the line/trunk circuit 12. All or only selected ones of the line/trunks may be provided with a priority selector switch. The priority reserve system also includes a link priority reserve circuit 66 that is intimately interconnected with the link allotter 40, as is schematically denoted in the drawing by the oppositely directed arrows joining these blocks; the circuit 66 is adapted for effectively assigning a priority status to a predetermined number of the M links.

The priority reserve circuit 66, as will be explained later herein, includes circuitry for preventing the allotter 40 from enabling any of the predetermined number of priority links until the remaining links are all in a busy condition. The link priority reserve circuit 66, in combination with the various priority selector switches, is operable to connect only priority status line/trunk circuits to the priority links. In this regard, an all normal links busy bus 68 is coupled from the priority reserve circuit 66 in common to all of the line/trunk circuits. When all normal links, i.e., nonpriority links, are in a busy condition, the bus 68 is energized resulting in a busy tone being provided in response to any incoming call attempted from the telephone of a normal, i.e., nonpriority, line/trunk circuit. The caller must wait until one of the normal links is restored to an idle condition before his call may successfully be made.

On the other hand, actuation of the priority selector switch 64 effectively precludes the energized busy bus 68 from impairing usual operation of the line/trunk circuit 12. Thus, an incoming call is extended in a normal manner to one of the priority links that has now been enabled by allotter 40 in accordance with a control signal input from link reserve circuit 66. A priority line/trunk may complete a call to even a nonpriority line/trunk. This is because the connect switch of each line/trunk is not prevented from signal marking its associated horizontal matrix terminal by virtue of a signal on busy bus 68.

For simplicity in the drawings, it is assumed that the number of priority links is maintained at a value equal to one-half the number of priority status line/trunks so that an all links busy bus is unnecessary. It is understood, however, that under more general circumstances such a bus is employed to provide an appropriate all links busy signal to the priority line/trunks when all of the links of the switchboard are in a busy condition.

The on-off setting of the priority selector of each line/trunk is not often altered and for this reason it is preferred that the selector switches be grouped on the back of the switchboard panel or in some similarly remote position so as not to be in a position to confuse or hinder the operator. On the other hand, the remaining switches and lamps of each line/trunk circuit and the lamps and switches of each link illustrated in FIG. 1 are conveniently grouped on the front display panel of the switchboard for easy viewing and use by the operator.

The switchboard of the present invention also utilizes DC control biases of a negative and positive polarity on the matrix talk path interconnecting a pair of line/trunk circuits (e.g., line/trunks 12, 14) and a link (e.g., link 20) for providing respectively a "forward" signaling indication from the pair of line/trunks to the link and a "reverse" signaling indication from the link to the pair of line/trunk circuits. More particularly, a first, i.e., a reverse, signaling means includes a priority switch 70 connected to link 20 and adapted upon actuation to result in an electrical control signal bias of a first predetermined polarity, herein a positive polarity, being developed on the vertical talk path lead 32 of the matrix 26.

Assuming as aforesaid that the link 20 is connected by the matrix to line/trunks 12 and 14, it will be recognized that the positive control signal bias on the vertical lead 32 of the matrix is electrically coupled to each of these line/trunk circuits. The line/trunks 12 and 14 include individual first indicator means responsive to a positive polarity DC bias on their respective matrix talk path leads for developing a first signal indication. In the preferred embodiment, the first indicator means includes individual priority lamps for each line/trunk, such as the exemplary priority lamp 72 of the line/trunk 12. Under the assumed conditions, both the lamp 72 and the corresponding lamp of the line/trunk 14 are lit.

The priority switch and lamp arrangement provides a convenient means by which the operator may mark a call "priority" when, for example, either the calling or called party requests that their conversation not be interrupted or terminated except in the utmost emergency. Of course, other interpretations and uses may be made of the first signaling system. At any rate, the present system intentionally excludes means for precluding an operator from interrupting or terminating the call; the operator is merely reminded of the request by the lamp indicators but may proceed to act according to his sound discretion. It will be recognized by those skilled in the art that electrical or mechanical interlocks or the like may be employed to physically prevent the operator from interrupting the call, if desired. The above "priority call" feature is not to be confused with the totally unrelated priority reserve system, earlier discussed.

An opposite or negative polarity DC control bias is used for the second or "forward" signaling system. More particularly and with reference to the representative line/trunk 12, the second signaling means includes a manually operable link locate switch 74 connected to the line/trunk 12 and adapted upon actuation to result in a negative polarity control signal bias being developed on the horizontal talk lead 30 of the crosspoint matrix 26. Assuming the line/trunk 12 is connected to the link 20 by the matrix 26, the negative bias is communicated to the link 20 causing a link locate lamp 76 to glow. The lamp 76 only glows during the intervals that the spring-loaded locate switch 74 remains depressed by the operator. Thus, an operator is enabled to promptly identify the link to which any line/trunk is connected, as is an essential preliminary to accessing and communicating with any party that is in the midst of a call. Since the link locate function is considered of greater importance than the "priority" call feature and since only a momentary signal indication is needed, the negative control bias of the link locate signaling means is adapted to overwhelm or override the positive bias of the "priority" signaling system.

The switchboard further comprises a common preempt switch 78 coupled by a bus 80 to each of the line/trunk circuits. The preempt switch 78 is adapted upon actuation to condition the link locate switches of each line/trunk to perform an additional, preempt function. Specifically, and assuming that the preempt switch 78 is actuated and further assuming that line/trunks 12 and 14 are engaged in a call through the link 20, depression of the link locate switch 74 is effective to interrupt within line/trunk 12 the hold current circuit for the matrix crosspoint 38 resulting in a disconnect of line/trunk 12 from the link 20. As will presently be explained, the link 20 includes a current detector responsive to disconnect of one party from the link to open that portion of the matrix hold current path within the link and thereby disconnect the remaining party (in this case the telephone of line/trunk 14) from the link. Such a preempt feature is necessary, for example, in an emergency to clear a link for an important incoming call.

Manual release switches, such as the release switch 81 of link 20, are provided for each of the links to enable the operator to manually disconnect any party from the corresponding link. Such is convenient, for example, when a magneto signaling phone fails to ring-off after conversing with the operator.

BRIEF SUMMARY OF OVERALL SWITCHBOARD OPERATION

In explaining the overall operation of the switchboard, it is initially assumed that link 20 is in an idle condition and that the allotter 40 has enabled this link to signal mark, i.e., to ground, the vertical matrix control lead 36. Assuming further that a call is now initiated from the telephone of line/trunk 12, seize circuit means within the block 12 develops a momentary negative signal pulse on the horizontal control lead 28. This momentarily energizes coil 38*c* to cause closure of the matrix crosspoint contacts 38*a* and 38*b* completing respectively a talk path and a hold current path to the link 20, all as previously discussed.

A current detector within the link 20 senses the current level flowing in the vertical matrix hold current lead 34 from the lead 28 and causes the service request lamp 47 to glow; the lamp 47 continues to glow until a second crosspoint is closed on the vertical matrix terminal of the link 20 to thereby complete the call. Furthermore, the vertical matrix signal marking lead 36 is isolated from the holding circuit by the blocking diode 38*d* while the vertical matrix talk lead 32 is electrically connected to the talk lead 30 of the line/trunk 12.

The automatic answer circuit 42 scans the links in sequence and upon encountering the energized service request input lead 54*a* of the link 20, the scanning circuits are stopped such that the talk control lead 50*c* coupled from the answer circuit 42 to the link 20 is in an energized condition. The common service request lamp 46 is restored to an off condition when the operator accesses the service requesting link, assuming such link to be the last link requesting service. Also, the operator is now connected to the link 20 and more particularly the matrix talk lead 32 through his headset 52 and the operator talk bus 48. It will be recalled that only one talk control lead is energized at any one time and that the talk bus 48 is effectively connected only to that link having an energized talk control lead. The operator is able to converse exclusively with the incoming call of line/trunk 12 and ascertain the identity of the party it is desired to reach.

Before proceeding further, it is important to recall that connection of the line/trunk 12 to the link 20 results in a deenergizing of the return lead from the link 20 to the allotter 40 thereby reenabling the normally free running allotter clock. Thus, the allotter 40 steps to the succeeding link 22 and, assuming link 22 is in an idle condition, the return lead of this link is energized and the allotter clock is again halted and the link 22 is enabled to signal mark its associated matrix control lead.

Assuming next that the caller of line/trunk 12 wishes to be connected to the phone of line/trunk 14, the operator depresses the connect switch of this line/trunk thereby coincidentally energizing both the horizontal matrix control lead associated with this line/trunk and the ADCE bus 62. The momentary signal pulse carried by the ADCE bus 62 effectively and temporarily inhibits the allotter 40 from enabling any link and accomplishes this by blocking any signal on the allotter output leads from the control lead marking circuitry of each and every link. On the other hand, the concurrent signals on the ADCE bus 62 and the talk control lead 50*c* cause a momentary signal marking of the control lead 36 of the link 20 coincidentally with the signal marking momentary energization of the horizontal matrix control lead of the line/trunk 14.

Thus, a matrix crosspoint 82 at the intersection of these leads is closed and the call is completed between line/trunks 12 and 14 by the closed matrix crosspoints 39, 82 and the link 20. The busy lamp of the line/trunk 14 is now lit as well as the busy lamp 63 of the line/trunk 12.

Assuming that the calling and called parties need no further assistance, the operator disconnects from the link 20 by a momentary depression of the queue advance switch 58.

Assuming that either the calling or called party of line/trunks 12 and 14, respectively, had requested that they not be interrupted, the operator would have depressed the priority switch 70 of the link 20 thereby concurrently energizing the priority lamps of both the line/trunks 12 and 14. As will be recalled, this is a mere mnemonic aid to the operator and the call may in fact be interrupted or terminated if the operator deems such action necessary.

In continuing with the explanation of the switchboard operation, it is now further assumed that an incoming call from line/trunk 16 is connected to the link 22 and further that it is imperative to connect this party to the telephone of the line/trunk 12. The operator is informed on glancing at the busy lamp of line/trunk 12 that this party is engaged in a conversation and that the call cannot be extended in conventional fashion. There are several ways in which the call may be completed but the preferred procedure is to preempt the call in which line/trunk 12 is presently engaged. This is accomplished by actuating the preempt switch 78 and then depressing the link locate switch 74. After a brief electronic warning signal, the line/trunk 12 is disconnected from the link 20; the link 20 then disconnects or drops the line/trunk 14 although the operator may not and need not know the identity of the line/trunk to which line/trunk 12 was connected. The operator now depresses the connect switch of line/trunk 12 to effect a connection of this line/trunk, the link 22 and the caller of the line/trunk 16. The operator may converse briefly with the connected parties to determine that additional assistance is unnecessary and then proceed to a succeeding service requesting link.

In certain instances, it is important for an operator to convey a message to a party that is engaged in a conversation as for example, the party of line/trunk 12 who is assumed to be connected to line/trunk 14 through link 20 and the matrix 26. The first step in accessing any busy line/trunk is to identify the link to which it is connected. In the present switchboard, this is promptly and efficiently done by depression of the respective link locate switch 74 of the line/trunk 12 thereby causing the appropriate link locate lamp, in this example lamp 76, to momentarily glow. The operator through conventional manual accessing is now able to connect to the link 20 and convey the message.

With the foregoing as background, it is now meaningful to examine in detail the manner in which each of the circuits perform the functions hereinbefore described:

LINK CIRCUIT

Figure 2:
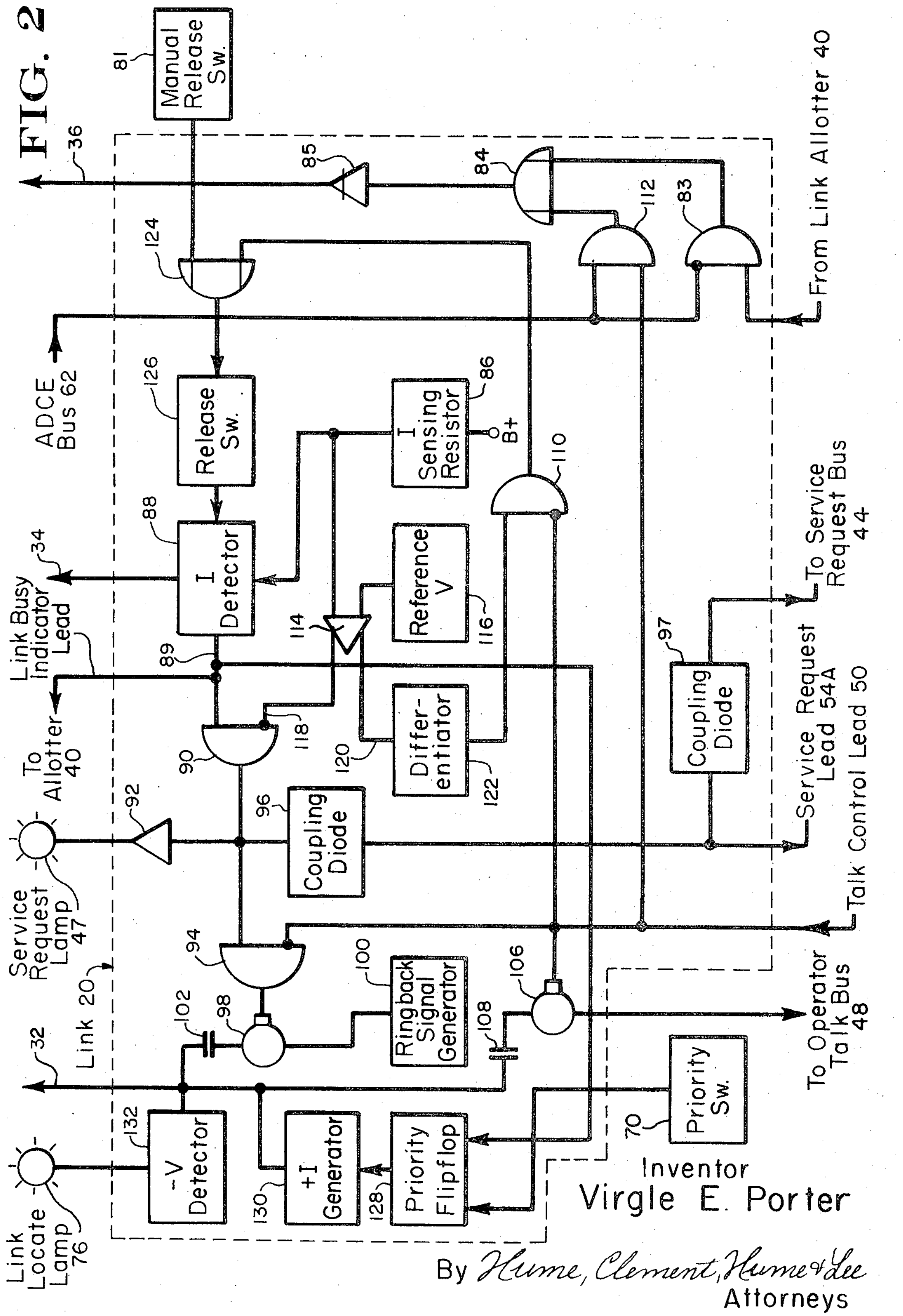
FIG. 2 is a logic block diagram of a preferred embodiment for the link circuits (except the conference link) shown in block outline in FIG. 1.

Referring now to FIG. 2, there is illustrated within the dashed outline a preferred embodiment of the representative link circuit 20 of FIG. 1. A number of manual switches and indicator lamps are peripherally associated with the link 20 and these are illustrated in FIG. 2 as well as various electrical lead connections to other portions of the switchboard.

The link 20 includes a normally unblocked inhibitor gate 83 having a single output coupled to a conventional OR gate 84 which, in turn, is connected to an inverter 85. The matrix control lead 36 is connected to the output of inverter 85 and this lead is normally at a high or unmarked signal potential. However, an energizing signal on the input lead from the link allotter 40 is translated by the gates 83, 84 and the inverter 85 to ground or signal mark the lead 36 thereby uniquely enabling the link 20 to receive the next incoming call.

Assuming that such a succeeding call now occurs, the vertical hold current lead 34 is electrically connected through the matrix and a line/trunk to ground. This causes a corresponding hold current to flow from a B+ supply of the link 20 through a series connected current sensing resistor 86 and a current detector 88 to the matrix hold current lead 34.

The current detector 88 is coupled by a common output lead 89 to the input of a normally unblocked inhibitor gate 90 and to the return lead for the allotter 40. In response to electrical current flow therethrough, the current detector 88 develops an output signal to reenable the normally free-running allotter clock and permit the allotter 40 to step to a succeeding idle link and signal mark the vertical control terminal of that link. The signal on lead 89 is also translated by the inhibitor gate 90 to the common junction of an amplifier 92, a normally unblocked inhibitor gate 94 and a coupling diode 96. The amplifier 92 responds to the signal from current detector 88 by igniting the service request lamp 47 to notify the operator that the link is in a service request condition. The individual service request lamps, as lamp 47, are only monitored when the operator is proceeding in a manual operating mode. In the automatic mode, the operator refers only to a common service request lamp of the automatic answering circuit 42. This latter lamp is concomitantly energized by the signal on current detector output lead 89, the signal being coupled through inhibitor gate 90, a pair of series coupling diodes 96, 97 and service request bus 44 to appropriate lamp energizing circuits of the automatic answer circuit 42 (not shown in FIG. 2). Of course, the common service request lamp is lit whenever at least one of the M links is requesting service.

The inhibitor gate 94 is likewise normally unblocked to translate the signal on lead 89 of detector 88 and thus remove an inhibit input to a normally blocked signal gate 98. A ringback signal generator 100 is coupled to the matrix talk lead 32 and thence to the incoming caller through the now opened gate 98 and a DC blocking capacitor 102. The ringback signal tone provides a positive indication to the caller that he is connected to the switchboard and such tone continues until the service request is acted upon by the operator. The ringback generator 100 has been shown for convenience to be included within the link 20 although it is to be understood that in practice the generator is coupled to all links by a common ringback signal bus.

The signal of the current detector output lead 89 is also translated by the gate 90 and the coupling diode 96 to the service request input lead 54*a* of the answer circuit 42. As will be recalled, a signal indication on the lead 54*a* stops the link scanner of the answer circuit at this link thereby energizing the normally deenergized talk control lead 50*a*.

The lead 50*a* connects to the inhibit input of the inhibitor gate 94 and to the inhibit input of a normally blocked signal gate 106. The gate 106 and a DC blocking capacitor 108 are connected in series between the operator talk bus 48 and the vertical lead 32 of the matrix 26. Accordingly, when the operator answer circuit is conditioned to access the link 20, a control bias is applied to talk control lead 50*a* to block inhibitor gate 94 and remove the ringback signal tone from the line of the incoming call and to concurrently unblock the gate 106 and allow the operator to converse with the party making the incoming call. The talk control lead 50*a* is also connected to an inhibit input of an inhibitor gate 110 and to one input of an AND gate 112, the functions of these gates to be considered hereinafter.

Upon ascertaining the identity of the party to be called, the operator depresses the connect switch of the corresponding line/trunk thereby placing a momentary signal pulse on the ADCE bus 62. The ADCE bus 62 is connected to a second input of the AND gate 112 and to the inhibit input of the inhibitor gate 83. The gate 83 is blocked and the matrix control lead 36 effectively isolated from the link allotter 40 during the momentary interval that the ADCE bus 62 is energized. A similar condition prevails in all of the remaining links for the duration of the pulse on the bus 62. On the other hand, the AND gate 112 receives concurrent inputs from the ADCE bus 62 and the energized talk control lead 50*a* thereby providing an output through the OR gate 84 to the inverter 85 which grounds or signal marks the vertical control lead 36. Since the answer circuit 42 energizes only the talk control lead of the link to which the operator is connected, in this case the lead 50*a*, only link 20 of all the links is enabled.

The resultant connection of the second line/trunk circuit to the link 20 now completes the call by closing a second crosspoint contact on the vertical talk lead 32 as well as a second contact on the hold current lead 34. This, of course, increases the hold current through the series connected sensing resistor 86 and current detector 88 twofold. In this regard, the output of the current sensing resistor 86 is also connected to one input of a conventional differential amplifier 114. A second input of differential amplifier 114 is supplied from a reference voltage source 116. The differential amplifier is provided with a pair of output leads 118 and 120 coupled respectively to the inhibit input of the inhibitor gate 90 and to the input of a conventional differentiator 122. The differentiator 122 is in turn connected to an input of a normally blocked inhibitor gate 110.

The differential amplifier 114 provides no effective output signal when only one matrix crosspoint is closed, i.e., when only one line/trunk is connected to the link 20. However, the increase in holding current attendant connection of a second line/trunk to the link 20 is sensed by the resistor 86 and the differential amplifier 114 responds to this increase in signal level by developing a signal on its output lead 118 to inhibit the gate 90. The service request lamp 47 is therefore extinguished and the service request lead 54*a* and the service request bus 44 are likewise deenergized.

Once the call is satisfactorily completed, the operator withdraws from the conversation, by actuating the queue advance switch 58 (see FIG. 1) to deenergize the control lead 50*c* and thereby respectively block the gate 106 and unblock the gates 94, 110. Although the latter gates are now conditioned for operation, no input signals are applied to them during the term of a normal two party phone conversation.

The call is terminated by one of the parties hanging-up or developing an equivalent signal that is sensed by the corresponding line/trunk so as to momentarily open the hold current circuit between the line/trunk and the link 20. The resultant release of one of the matrix crosspoints reduces the holding current through the sensing resistor 86 and a momentary signal pulse is provided to the unblocked inhibitor gate 110 from the amplifier output lead 120 through the differentiator 122. The current reduction at the input of differential amplifier 114 also momentarily removes the inhibit input on lead 118 of inhibitor gate 90. Thus, the service request lamp 47 blinks on for a brief interval prior to dropping of the second crosspoint.

The unblocked inhibitor gate 110 translates the aforesaid signal pulse to one input of an OR gate 124. The OR gate 124 is connected to a release switch 126 which in turn is coupled to the current detector 88; the signal pulse from gate 110 is translated by the OR gate 124 and energizes the release switch 126 thereby momentarily opening the hold current path between the link and the remaining line/trunk circuit. The second matrix crosspoint on the hold current lead 34 is involuntarily released, i.e., the second party is released from the link regardless of whether or not he hangs-up or rings-off, by virtue of this arrangement. The link 20 is now in an idle condition.

A second input of the OR gate 124 is provided from a manual release switch 81. The release switch 81 permits direct termination of a call by the operator resulting in all line/trunks being concurrently disconnected from the link 20 in the same manner as above described.

The link 20 also includes the signaling portion of the "reverse" signaling means, the purpose and general operation of this signaling system having been described earlier herein. Specifically, the manual operable "priority" switch 70 of the signaling system is coupled to a first input of a priority flip-flop 128 which may be a conventional bistable multivibrator. A positive polarity DC current generator 130 is normally in a quiescent or off condition but is rendered operative from the output of flip-flop 128 upon actuation of the priority switch 70 to set the flip-flop output to an "on" condition. A second input of the flip-flop 128 is taken from the output terminal 89 of the current detector 88. Thus, whenever the link 20 is restored to an idle condition the priority flip-flop 128 is likewise restored to its alternate or "off" state to turn off the current generator 130.

The link 20 also includes the indicator portion, namely, a negative control bias detector 132, of the second or "forward" signaling system. The purpose and general operation of this system was earlier discussed herein. The bias detector 132 is coupled to the matrix talk path lead 32 and is responsive to a negative polarity bias on this lead to ignite the link locate lamp 76.

In briefly summarizing the operation of the link, it is initially assumed that the link 20 is enabled by the allotter 40, i.e., the allotter input lead to the link 20 is energized, and that an incoming call has just been placed through one of the N line/trunk circuits. Thus, the matrix control lead 36 is signal marked or grounded by the energizing signal from the allotter input lead through series gates 83, 84 and the inverter 85. The line/trunk through which the incoming call is placed is connected to the link 20 initially by the signal marked control lead 36 and then by the talk lead 32 and hold current lead 34, as earlier discussed.

A talk path is now completed between the link and line/trunk and a proportional hold current flows from the B+ supply through the sensing resistor 86 and the current detector 88 to the lead 34. The resultant signal on the output lead 89 of the current detector 88 energizes the return lead to allotter 40 causing the allotter to step to the next idle link and ignites the service request lamp 47 through the inhibitor gate 90 and amplifier 92. The service request bus 44 and the service request lead 54 are also energized. Accordingly, the common service request lamp of answer circuit 42 now glows and the scanner of this circuit is conditioned to stop at link 20 on its succeeding operating cycle. The signal on detector output lead 89 is also communicated through the inhibitor gates 90, 94 to unblock signal gate 98 and permit a ringback signal tone from generator 100 to be communicated to the incoming call along the talk lead 32.

When the scanner steps to the link 20, the incoming talk control lead 50*c* from answer circuit 42 is energized to inhibit gate 94 and unblock signal gate 106; therefore, the ringback signal generator is disconnected from the talk lead 32 by the blocked gate 98 and the operator is enabled to communicate with the incoming call along the completed electrical path from the talk bus 48 to the matrix talk lead 32. The energized control lead 50*c* inhibits the gate 110 and provides a first enabling input to the AND gate 112.

The operator converses with the party who made the incoming call to ascertain the identity of the line/trunk to be reached. The operator then depresses the connect switch of the desired line/trunk to momentarily energize the corresponding horizontal control lead and the ADCE bus 62. The signal on bus 62 inhibits the gate 83 and the similar gates of all remaining links to effectively disconnect the link allotter 40 from all of the links for a predetermined brief time interval. The signal on bus 62 further provides a second enabling input for the AND gate 112 thereby signal marking the matrix control lead 36 through the OR gate 84 and the inverter 85. The concurrent signal markings on the aforesaid horizontal and vertical control leads causes the crosspoint at their intersection to close and electrically interconnect the second line/trunk and the link 20.

The crosspoint hold current flowing through the current sensing resistor 86 is now doubled resulting in a correspondingly greater input signal to differential amplifier 114. The resultant signal on the amplifier output lead 118 inhibits the gate 90 thereby extinguishing the service request lamp 47 and removing the signals from the service request lead 54*a* and the common service request bus 44.

The operator may mark the call priority at the request of either the calling or called party by depression of the priority switch 70 which enables the positive control bias current generator 130 by setting the flip-flop 128 to an "on" state. The priority indicator lamps associated with the connected line/trunks are lit by virtue of the appropriate polarity control bias communicated to them along the talk lead 32.

After providing all needed assistance, the operator withdraws from the completed call by a second depression of the queue advance switch 58 (FIG. 1) which deenergizes the control lead 50*c* to block the talk path gate 106 and remove the inhibit input to the inhibitor gate 110 as well as the enabling input to the AND gate 112.

Typically, a telephone call is terminated by one of the parties hanging-up or the like which causes call terminating circuitry in the line/trunk to momentarily open the matrix hold current path between the line/trunk and the link thereby disconnecting these circuit blocks. The resultant reduction in hold current through current sensing resistor 86 results in a change in signal level on the output lead 120 of the differential amplifier 114. The differentiator 122 operates on the output signal to provide a momentary signal pulse to the inhibitor gate 110. The signal pulse is translated by the unblocked inhibitor gate 110 and the succeeding OR gate 124 to the release switch 126. The release switch 126 momentarily opens the hold current path of lead 34 to disconnect the second line/trunk from the link 20 regardless of whether or not the second party hangs-up, rings-off or the like. The output signal on lead 89 of the current detector 88 also resets the flip-flop 128 to restore current generator 130 to a quiescent or off condition. The link 20 is now in an idle condition and so remains until the link is again enabled from the allotter 40.

The operator may also manually release a call by direct actuation of the manual release switch 81. This feature is essential, for example, where a party calls the operator to seek certain information, etc. and then fails to hang-up or ring-off.

LINE/TRUNK CIRCUIT

Figure 3:
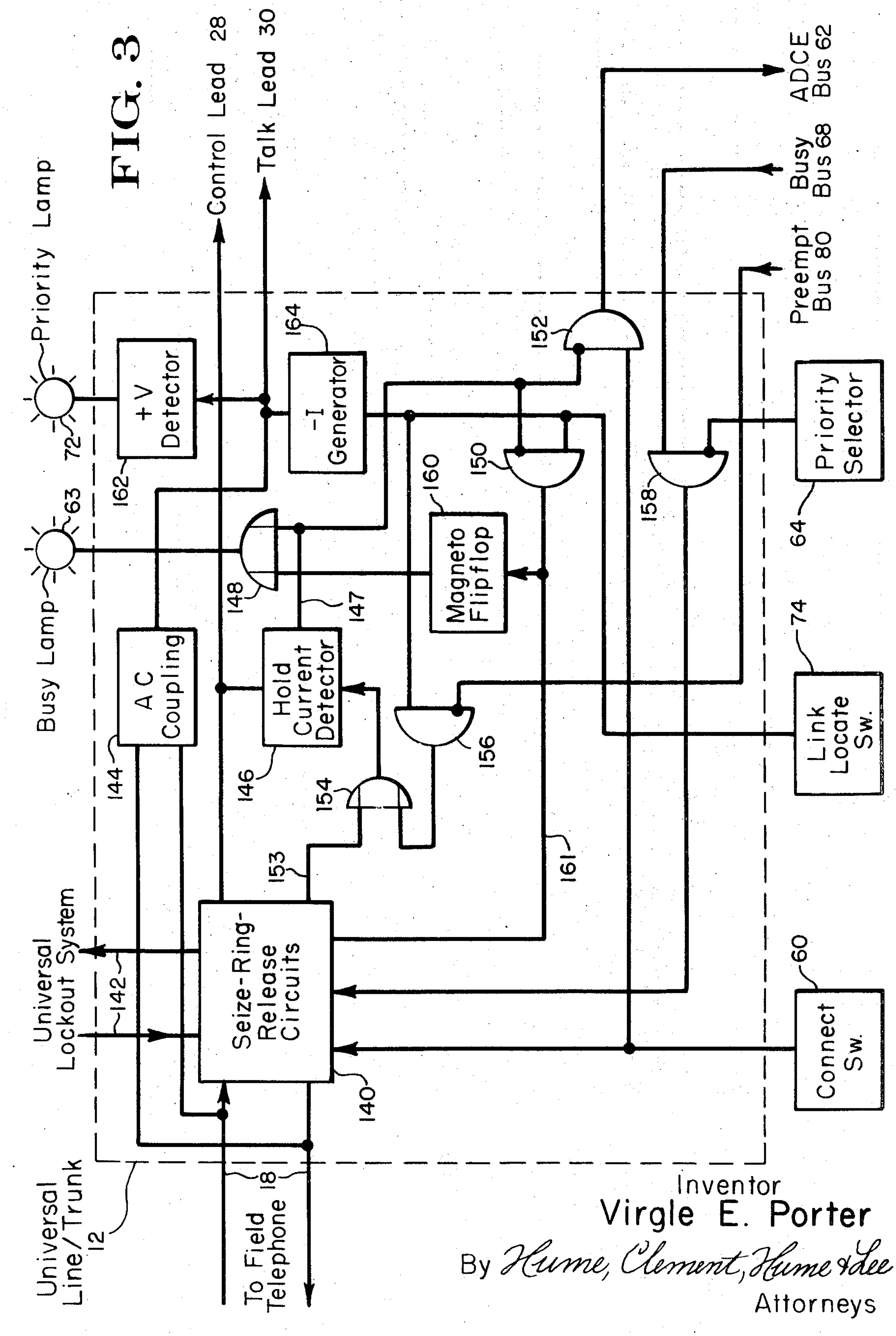
FIG. 3 is a logic block diagram of a preferred embodiment for the universal line/trunk circuits shown in block outline in FIG. 1.

Referring now to FIG. 3, the illustrated and preferred embodiment of the representative line/trunk 12 comprises conventional seize-ring-release circuit means 140. Means 140 is connected to an associated telephone (not shown) along a bilateral talk path schematically represented in the drawing by the arrows 18. Typically, the talk path is a two-wire balanced pair although in those instances where the phone is located at an extended distance from the switchboard conventional repeater or hybrid units may be interposed in the line in which case the input to the line/trunk is a four-wire pair.

At any rate, the conventional circuits 140 are responsive to a first predetermined input signal from the telephone to provide a momentary negative polarity current impulse on the horizontal matrix control lead 28 thereby to signal mark this lead and interconnect the line/trunk with an enabled one of the link circuits. A second predetermined input signal from the telephone results in an opening of the hold current path for the matrix crosspoint to terminate the aforesaid interconnection. More particularly, the conventional circuits 140 are adapted to respond to either common battery signaling, i.e., the application and removal of a battery bias from the input leads 18 by removing and restoring, respectively, a telephone from its hook, and magnetotype signaling wherein a telephone hand-crank is utilized to provide a momentary signal pulse to respectively initiate and terminate a call. Of course, other forms of telephone signaling may be employed if desired.

The circuit 140 is connected by leads 142 to a universal lockout system (not shown) of conventional construction. As is well understood in the art, the lockout system prevents two or more line/trunks that are seized at almost the same moment from being connected to the same link. This positive traffic sorting is accomplished either by a time division technique wherein each line/trunk of the system is enabled to respond to an incoming call only during its unique "time frame" or by conventional space division techniques.

The seizure of an enabled link by the line/trunk 12 completes circuit paths to the link along the control lead 28 and the talk lead 30. The talk lead 30 of the matrix is connected to the field lines 18 of the telephone through a bidirectional AC coupler 144, such as a conventional transformer which provides DC isolation between the field telephone and the matrix.

A hold current detector 146 is coupled to the matrix control lead 28 to provide a path to ground for the matrix hold current flowing in the control-hold current lead 28. An output lead 147 of detector 146 is connected to one input of an OR gate 148 and to the inhibit inputs of a pair of inhibitor gates 150 and 152, respectively. The detector 146 provides inhibiting inputs to the inhibitor gates 150, 152 and an input to the OR gate 148 to energize the busy lamp 63 in response to hold current flow through the detector.

In order to disconnect the line/trunk 12 from the link upon completion of a call, an output lead 153 of the circuit means 140 is connected by an OR gate 154 to the hold current detector 146. The lead 153 is momentarily energized upon termination of a call resulting in signal pulse being translated through the OR gate 154 to the hold current detector 146. The detector 146 responds to the signal pulse by momentarily opening the matrix hold current circuit to disconnect the line/trunk and link. In the absence of a hold current through detector 146, the detector output lead 147 is deenergized; accordingly, the busy lamp 63 is unlit and the inhibitor gates 150 and 152 are unblocked.

A telephone call may also be terminated by the operator either with or without the consent of the calling parties. To this end, the preempt bus 80 is connected from the common preempt switch 78 (see FIG. 1) to the inhibit input of an inhibitor gate 156. The gate 156 is provided an input from the link locate switch 74 and its output is connected to the hold current detector 146 through a second input of the OR gate 154. The preempt bus 80 is normally at a high signal level to block the inhibitor gate 156 but upon actuation of the preempt switch 78 the gate 156 is unblocked so that a subsequent depression of the link locate switch 74 communicates a signal pulse to the matrix hold current detector 146 through the series connected gates 156 and 154. This signal pulse effects a termination of the call in the same fashion as earlier described in connection with the signal pulse applied to the output lead 153 of circuit 140.

The line/trunk circuit 12 includes means for providing a busy signal to its associated telephone in the event that all of the available links are in a busy condition. To this end, the all normal links busy bus 68 is connected to the circuits 140 through an input of an inhibitor gate 158. The presence of a signal on the busy bus 68 conditions conventional apparatus within the circuit means 140 to provide a busy tone to the telephone and concurrently precludes development of a signal marking on the control lead 28 even if the connect switch 60 is actuated.

In accordance with the present invention, the line/trunk 12 may be assigned a priority status thereby enabling the telephone of line/trunk 12 to complete calls even though all of the normal links, i.e., nonpriority links, are in a busy condition. This means comprises the priority selector switch 64 which is coupled to an inhibit input of the inhibitor gate 158. Setting of the switch 64 to the priority position provides an inhibit input to the gate 158 and prevents the control signal of busy bus 68 from reaching the circuit 140. Thus, an incoming call is extended in normal fashion but, of course, is connected to an allotted one of the priority links. The manner in which certain, priority, links are held in reserve until all of the normal links are in a busy condition is considered in detail in connection with the discussion of the circuit of FIG. 4 later herein.

It will be recalled that either the calling or called party may terminate the call by hanging-up in the case of a phone having common battery signaling and ringing-off in the case of a telephone having magnetotype signaling. Once either party terminates the call, previously described release circuitry within the link opens the matrix crosspoint hold current path connecting the link to the remaining line/trunk. If the phone connected to the aforesaid remaining line/trunk is of the magneto signaling type, the act of ringing-off subsequent to complete termination of the call in fact reenergizes the line/trunk busy lamp and may mislead the operator into believing that the party is actually ringing-on, i.e., attempting to place an incoming call.

This misleading signal indication is effectively obviated in accordance with the present invention by means including a bistable memory device or magneto flip-flop 160. The single input lead of flip-flop 160 is connected to an output lead 161 of the circuit 140 and the output of the inhibitor gate 150. The single output terminal of flip-flop 160 is coupled by the OR gate 148 to the busy lamp 63.

Initiation of a call by magneto signaling connects line/trunk 12 to a link and develops a signal pulse on the lead 161 to energize the output lead of flip-flop 160 thereby igniting the busy lamp 63 through the OR gate 148. This busy lamp energizing signal is redundant at this point in time since it will be recalled that the hold current detector 146 also provides an energizing input to the gate 148 during connection of the line/trunk 12 to a link. Assuming the call is terminated by the party to which line/trunk 12 is connected, release means within the link opens the hold current circuit for the line/trunk 12 to deenergize the output lead 147 of the hold current detector 146. The magneto flip-flop 160 continues, however, to maintain the busy lamp 63 in a lit condition until a ring-off signal is communicated along the lead 161 to the flip-flop 160.

As explained above, the magneto flip-flop 160 and its associated circuitry maintain the lamp 63 lit irrespective of connection of the line/trunk 12 to a link, and therefore, may actually create an "artificial" busy condition. The operator may challenge a busy lamp indication to determine whether it is "artificial" or actual by depression of the link locate switch 74. The switch 74 is connected to the input of magneto flip-flop 160 through the inhibitor gate 150. Assuming the busy condition is artificial, depression of the link locate switch 74 provides an effective input to the flip-flop 160 to deenergize its output lead and extinguish the busy lamp 63. On the other hand, if the busy signal indication is actual, i.e., a consequence of connection of the line/trunk 12 to a link, the gate 150 is inhibited by the signal on the output lead 147 of the hold current detector 146 and depression of the link locate switch is unable to alter the state of flip-flop 160.

There is associated with the line/trunk 12 connect means enabling the operator to promptly and efficiently complete a call from one line/trunk to the line/trunk 12. This means includes the connect switch 60 which is coupled by a common lead to the seize-ring-release circuit 140 and to an input of the inhibitor gate 152. Assuming the line/trunk 12 to be in an idle condition, i.e., not busy, depression of the connect switch 60 actuates conventional circuit apparatus within circuit block 140 resulting in a ring tone being translated along the telephone lines 18 to the telephone (not shown) and a momentary signal marking pulse being developed on the horizontal matrix control lead 28. Concurrently with the signal marking of control lead 28, the input from connect switch 60 to gate 152 results in the ADCE bus 62 being momentarily energized. The line/trunk 12 is therefore connected only to the link having the incoming call for the line/trunk 12, as previously discussed in connection with FIGS. 1 and 2.

Assuming line/trunk 12 was in a busy condition at the time the operator attempted to complete the call by depression of connect switch 60, conventional apparatus within circuit block 140 precludes both a ring tone and a signal marking of the control lead 28 from being developed. Also, the hold current detector 146 provides an inhibit input to the gate 152 to prevent energization of the ADCE bus 62.

There is further associated with the line/trunk 12 the indicator portion of the first signaling system, the signaling portion of this same system being previously described in connection with the link circuit of FIG. 2. A positive polarity control bias detector 162 is connected to the matrix talk lead 30 and is adapted to energize the priority indicator lamp 72 in response to a positive DC control bias on the lead 30. As will be recalled, a positive control bias is developed on the talk lead 30 by virtue of the operator depressing the priority switch of the link to which line/trunk 12 is connected.

There is also associated with the line/trunk 12 the signaling portion of the link locate system. The link locate signaling means comprises a negative control bias signal generator 164 connected in series between the link locate switch 74 and the talk lead 30; generator 164 is normally in a quiescent or off condition but is energized upon depression of the link locate switch 74. The negative control bias on the talk lead 30 is communicated to the link to which line/trunk 12 is connected and causes the corresponding link locate lamp to glow but only so long as the switch 74 remains depressed.

In briefly summarizing the operation of the line/trunk 12, it is assumed that an incoming call is being placed from its associated telephone causing a momentary signal marking pulse to be developed on the matrix control lead 28 and an electrical connection completed through the matrix to an enabled link. The hold current flowing from the lead 28 through current detector 146 to ground results in signal on detector output lead 147 to energize busy lamp 63 through the OR gate 148; gates 150 and 152 are inhibited.

The operator accesses the link to which line/trunk 12 is connected and orally communicates with the caller along the talk path extending from the link through the matrix, the AC coupler 144 of the line/trunk 12 and the telephone lines 18 to the telephone. Upon ascertaining the identity of the party to be called, the operator completes the call in a manner presently to be explained.

Assuming now that the telephone of the line/trunk 12 hangs-up or rings-off from a completed two-party call, the output lead 153 of circuit 140 is momentarily energized to communicate a corresponding signal pulse to the hold current detector 146 through the OR gate 154. The detector 146 responds to the signal pulse by momentarily opening the hold current path to disconnect line/trunk 12 from a link. The detector output lead 147 is also deenergized to turn off busy lamp 63 through OR gate 148; the inhibit inputs of gates 150 and 152 are likewise removed.

The explanation of the operation of the magneto flip-flop 160 and its associated circuitry to create an artificial busy condition upon failure of a party to ring-off is rather complex and lengthy. Therefore, the explanation will not be repeated in the present summary.

Assuming now that a call originating in another line/trunk is desired to be connected to the line/trunk 12, the operator depresses the connect switch 60 resulting in a ring tone to the telephone and a momentary signal marking pulse on the horizontal control lead 28. Actuation of the connect switch 60 also energizes the ADCE bus 62 through the inhibitor gate 152 but only if, as assumed, the line/trunk 12 is in an idle condition. The concurrent energization of ADCE bus 62 and control lead 28 results in the incoming call being connected to line/trunk 12 through the matrix 26.

If subsequent to completion of this call, the operator desires to communicate with the calling and/or called party, the link locate switch 74 is depressed to develop a negative DC control bias on the talk lead 30 through the current generator 164. The link locate lamp of the link to which line/trunk 12 is connected then glows and the operator may access this link in the manner previously discussed.

A call is preempted by a two-step procedure, the first step of which requires actuation of the common preempt switch 78 (FIG. 1); the switch 78 is connected by the preempt bus 80 to the inhibit input of gate 156, and upon actuation of the switch 78 the normal inhibit input to gate 156 is removed. The link locate switch 74 is now conditioned to perform the additional function of preempting the call by virtue of the completed electrical signal path from switch 74 to the hold current detector 146 through the series combination of the unblocked inhibitor gate 156 and the OR gate 154. Actuation of link switch 74 (the second step) momentarily opens the hold current path within detector 146 to release the connection of the line/trunk 12 and a link.

The line/trunk 12 is accorded a priority status by actuation of the selector switch 64 to inhibit the gate 158 and preclude a busy signal of the all normal links busy bus 68 from reaching the circuit block 140. An incoming call of line/trunk 12 therefore proceeds in normal fashion and is connected by the matrix 26 to one of the priority links that has now been enabled by the link priority reserve system. Of course, if the priority selector 64 is in an off condition, the busy signal on bus 68 is applied to circuit block 140 and conventional apparatus therein develops a busy tone while simultaneously preventing signal marking of the horizontal control lead 28.

LINK PRIORITY RESERVE SYSTEM

Figure 4:
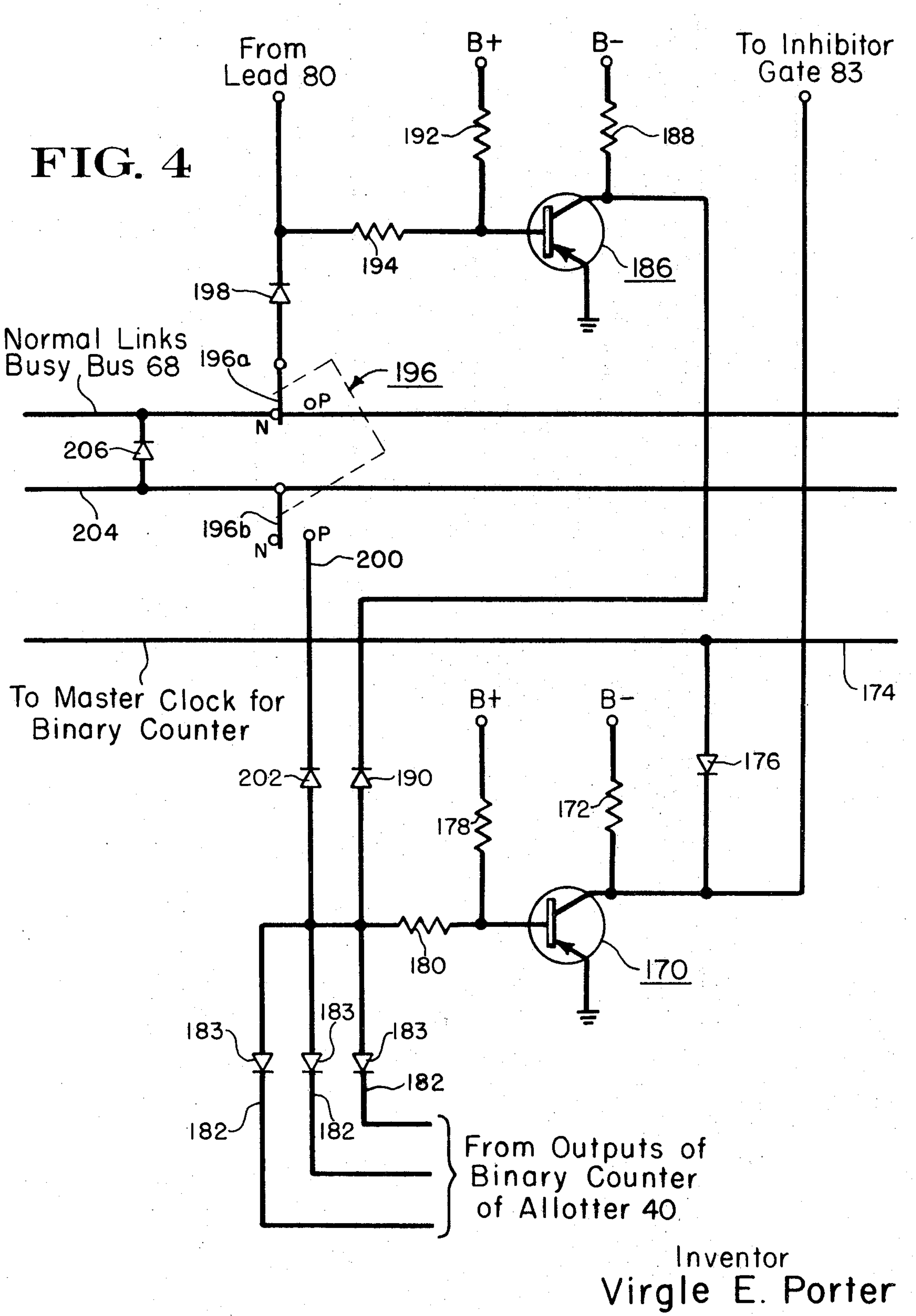
FIG. 4 is a schematic circuit diagram of a preferred embodiment of one of the series of repetitive stages of the link priority reserve and allotter circuits of FIG. 1.

Referring now to FIG. 4, there is shown a representative one of a series of identical circuit stages of the intimately interconnected link allotter and link priority reserve circuits 40 and 66, respectively. There is one such stage for each link of the switchboard.

As background, it will be recalled that the link allotter 40 comprises a binary counter, a decoder, and a normally free running clock for incrementing the counter to successively energize the output leads of the decoder. When an idle link is encountered, the corresponding energized decoder lead enables the vertical matrix control lead of the link to be signal marked and a return signal is provided from the link to the allotter for disabling the clock and maintaining the allotter on the idle link.

The purpose of the priority reserve system is to provide a superior grade of service to a preselected number of the total line/trunks of the switchboard. This is accomplished by assigning a priority status to certain of the line/trunks, as earlier discussed, and by maintaining a select number of links in reserve until all of the remaining links are in a busy condition. At this time, the priority links are successively allotted and by virtue of the priority selector associated with each line/trunk, only priority line/trunks are connected to priority links; a normal line/trunk incurs a busy signal.

Referring now specifically to FIG. 4, the representative circuit stage there shown comprises a PNP transistor output stage 170 having its collector electrode coupled to a corresponding output lead of the allotter 40 and thence to the inhibitor gate 83 (FIG. 2). The collector of transistor 170 is also coupled to a B− operating supply through a load resistor 172 and to an electrically conductive bus 174 by a diode 176 poled so that its cathode terminal is connected to the collector of the transistor 170. The bus 174 is connected to the normally free running clock (not shown) of the allotter 40; a negative polarity bias on the bus 174 is adapted to deenergize the clock.

The base electrode of transistor 170 is connected to a B+ bias supply by a resistor 178 and to the common junction of a plurality of input leads by a current limiting resistor 180. Each of a first group of input leads, designated generally by the reference numeral 182, is connected by an individual diode 183 to a respective output terminal of the binary counter (not shown) of the allotter 40. Although only three input leads 182 are illustrated, it is understood that the total number of leads is such as to provide a unique signal code for each of the M link circuits. For example, assuming there are sixteen links, a four stage binary counter is provided having four input leads coupled to the current limiting resistor 180 to define sixteen unique signal combinations.

Normally at least one of the leads 182 is at a negative potential by virtue of the negative output coupled from the corresponding lead of the binary counter through a respective diode 183. This results in the transistor 170 being in a saturated or on condition to develop a ground potential at its collector electrode. Thus, the link to which the allot lead of transistor 170 is connected is not enabled and the bus 174 is deenergized permitting continued free running of the counter clock.

Once each counting cycle for each circuit stage, the input leads 182 from the counter all attain a ground potential and the transistor 170 is biased to an off condition by the B+ supply. The B− collector supply of transistor 170 develops a negative signal potential on the allot lead to inhibitor 83 (FIG. 2) and also on the bus 174 to deenergize the allotter clock. Thus, the counter is not again incremented and all of the input leads 182 of the illustrated circuit stage remain grounded; the link connected to transistor 170 is placed in an enabled condition.

The circuit of FIG. 4 also includes apparatus for preventing a busy link from being allotted. Specifically, this circuitry includes a PNP transistor 186 connected in a grounded emitter configuration and having its collector electrode connected to an appropriate B− operating supply through a load resistor 188. The collector of transistor 186 is also connected by a diode 190 to one terminal of the current limiting resistor 180, the diode 190 being poled to conduct on a negative signal polarity at the collector of transistor 186.

The base electrode of transistor 186 is coupled to a B+ bias supply through a bias resistor 192 and to a link busy indicator lead (denoted by the legend "from lead 89" in the drawing) by a current limiting resistor 194. The busy indicator lead 89 is normally at a negative potential to maintain transistor 186 in a saturated on condition but assumes a ground potential to turn off transistor 186 when its corresponding link is in a busy condition. Therefore, a negative potential is applied through the isolating diode 190 to the base of the transistor 170 to maintain transistor 170 on whenever the associated link is in a busy condition irrespective of whether all of allotter leads 182 are at a ground potential. Thus, the link for this circuit stage is not allotted and the allotter clock is not halted whenever the link is busy.

A priority or normal status is assigned to the link associated with the circuit stage of FIG. 4 by means of a ganged switch pair 196. A first contact arm **196*a* of switch 196 is movable between a normal and a priority contact position designated in the drawings by the letters "N" and "P", respectively. The fixed end of contact arm 196*a* is coupled to the anode of a diode 198 which has its cathode terminal connected to the junction of the busy indicator lead 89 and the current limiting resistor 194**.

The movable contact arm **196*a* is connected to the normal links busy bus 68 in the illustrated normal position and to an open or floating contact in the priority position. Conversely, the movable switch arm 196*b* abuts an open or floating contact in the "N" or normal position and is connected to a lead 200 in the "P" or priority position. The lead 200 is connected to the common junction of leads 182 by a diode 202 poled to conduct on negative polarity signals between lead 200 and the aforesaid common junction. The fixed end of contact arm 196*b* is connected to an electrical bus 204; busy bus 68 is coupled to the bus 204 by an isolating diode 206 poled to translate negative polarity signals from the bus 68 to the bus 204**.

In the normal or nonpriority position of the switch apparatus 196 illustrated in the drawing, the busy bus 68 as well as the bus 204 carry a negative control bias so long as any normal link in an idle condition. This is because the busy indicator lead 89 and the similar leads of all other normal links are at a negative potential whenever any normal link is idle and this same negative potential is coupled by the diode 198 and the diode 206 to buses 68 and 204, respectively.

The busy indicator lead 89 goes to ground when its associated link is in a busy condition; although the negative signal potential is now removed, the aforesaid ground potential is isolated from the buses 68 and 204 by the diode 198. When all of the normal links assume a busy condition, the negative control bias is removed from the buses 68 and 204. By virtue of the connection of the all normal links busy bus 68 to each of the N line/trunks, additional incoming calls from normal line/trunks are now blocked and the calling parties receive a busy tone from their respective line/trunk circuits, as earlier discussed.

Assuming now that the movable contact arms **196*a* and 196*b* are moved to their "P" or priority positions, it will be recognized that the busy indicator lead 89 is no longer connected to the normal links busy bus 68. Thus, a negative signal potential is not applied from a priority link to the busy bus 68 under any circumstances or, in other words, the signal bias condition of the busy bus 68 is independent of the priority links. Also, under the assumed conditions, the normal links busy bus 68 is connected by the diode 206, the lead 200 and the similarly poled diode 202 to the common junction of the input leads 182 of the transistor 170. The negative potential present on bus 68 when any normal link is in an idle condition is coupled to the base of transistor 170 through the current limiting resistor 180 and precludes turn-off of this transistor irrespective of the signal inputs on the leads 182. This prevents the link associated with transistor 170 from being enabled until all of the normal links are busy, i.e., the negative signal potential is removed from the busy bus 68**.

OPERATOR AUTOMATIC ANSWER CIRCUITS

Figure 5:
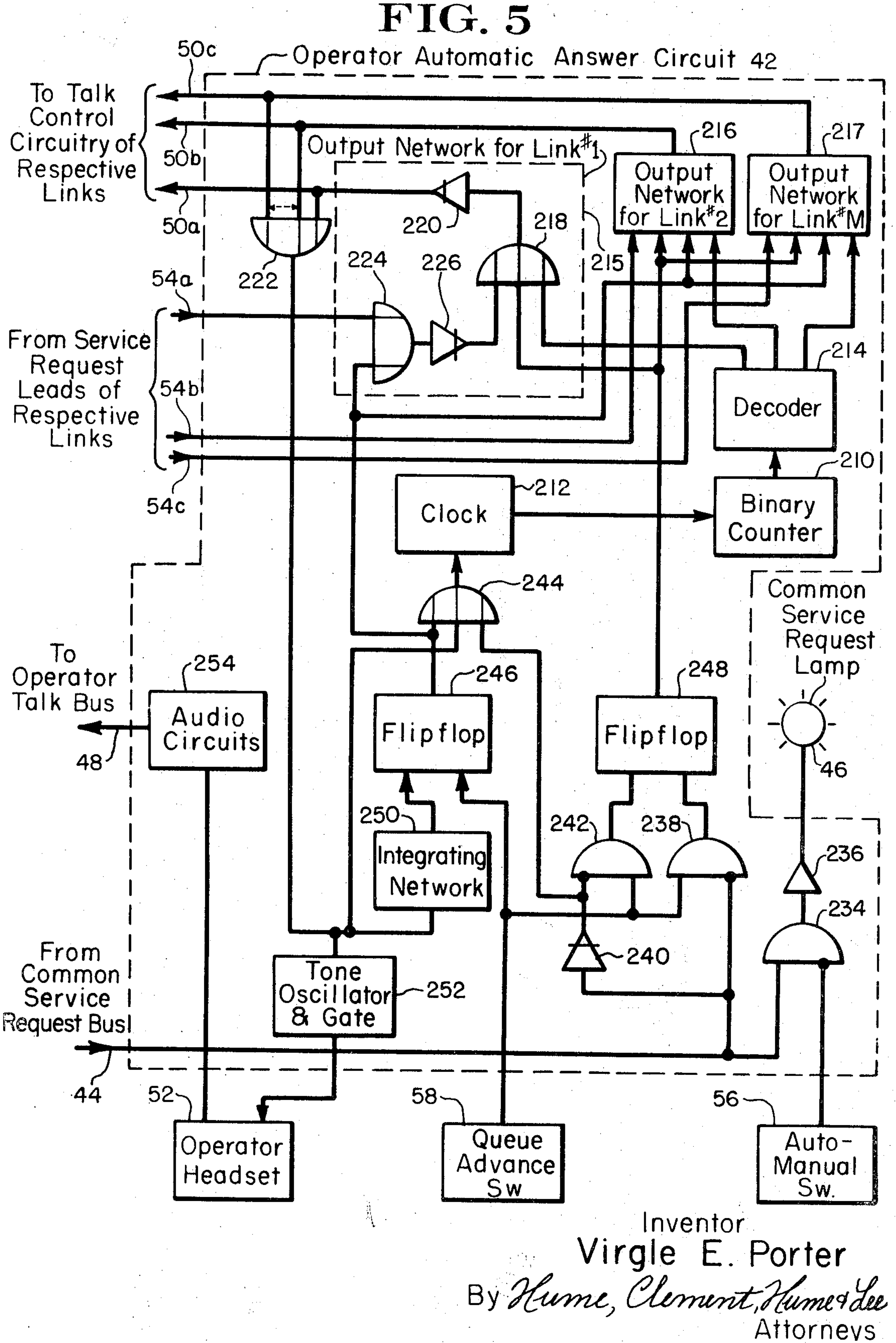
FIG. 5 is a logic block diagram of a preferred embodiment of the operator automatic answer circuit of FIG. 1.

Referring now to FIG. 5, the automatic answer circuit 42 there illustrated comprises a conventional binary counter 210 that is adapted to be sequenced by a clock 212. The counter 210 is coupled to a decoder 214 which is in turn coupled by individual output leads to respective output networks for the links 1, 2 ... M. For simplicity, only three of the series of M identical output networks 215, 216 and 217 of answer circuit 42 are illustrated in the drawing and, of these, only network 215 is depicted in detail.

The representative network 215 includes an OR gate 218 having a first input from an associated one of the decoder output leads. The OR gate 218 is coupled to an inverter 220 which, in turn, is connected to the talk control lead **50*a* (FIGS. 1 and 2) and to one input of an OR gate 222. The remaining inputs of the OR gate 222** are taken from similar leads of the remaining output networks.

The network 215 further includes an OR gate 224 having a first input from its associated service request lead **54*a* and having an output coupled to an inverter 226. The inverter 226 is connected as a second input to the OR gate 218. In the absence of an input signal on service request lead 54*a*, a negative polarity signal is developed at the output of OR gate 218 as a result of the normal output signal of inverter 226. A negative output of OR gate 218 maintains the talk control lead 50*a* as well as the input to the OR gate 222 in a deenergized or ground condition through the inverter 220**.

The automatic answer circuit 42 includes circuitry to maintain an associated common service request lamp 46 in a lit condition whenever at least one of the M links is in a service request condition. More particularly, the common service request bus 44 is coupled to an input of an inhibitor gate 234, the output of which is coupled to the lamp 46 through a conventional amplifier 236. The gate 234 is inhibited to prevent operation of light 46 only if the automatic/manual switch is in a "manual" position.

The service request bus 44 is also coupled to an inhibit input of an inhibitor gate 238 and through an inverter 240 to an inhibit input of an additional inhibitor gate 242. The output of inverter 240 is also connected to one input of an OR gate 244. The OR gate 244 is connected to the clock 212; the clock 212 is shutoff if any one of the three inputs to OR gate 244 is energized, i.e., at a negative signal potential.

The bus 44 is deenergized in the absence of a service request from any of the M links and thus gate 234 is provided no input to energize the common service request lamp 46. Likewise, there is no input on the inhibitor lead of the gate 238 while conversely the gate 242 is inhibited by the opposite or negative polarity signal coupled to its inhibit input from the inverter 240. The signal from the inverter 240 also provides an input to the gate 244 to maintain the clock 212 in an off condition. On the other hand, if one or more links are requesting service, the bus 44 is energized to light the lamp 46 and respectively block and unblock the inhibitor gates 238 and 242. The input to OR gate 244 from inverter 240 is also deenergized to permit clock 212 to operate, assuming that the other two inputs to OR gate 244 are also deenergized.

The queue advance switch 58 is connected to one input of a conventional flip-flop 246 and to the respective inputs of inhibitor gates 238 and 242. Each actuation of the advance switch 58 develops a momentary signal pulse that is communicated to one or the other of a pair of inputs of a flip-flop 248 depending on which of the inhibitor gates 238, 242 is in an unblocked condition. The flip-flop 248 is provided with a singular output lead coupled to the second or middle input of the OR gate 218 of network 215 as well as to similar gates of the output networks for the remaining M links. The output lead of flip-flop 248 is grounded or deenergized in response to an input received through gate 242 and, conversely, is energized, i.e., placed at a predetermined negative signal potential, upon receiving an input through the inhibitor gate 238. Actuation of the advance switch 58 also resets flip-flop 246 such that its output lead is in a zero or deenergized condition.

The OR gate 222 is connected by its output lead to an alternate input of the flip-flop 246 through a conventional time integrating network 250. The integrating network 250 substantially precludes spurious actuation of the flip-flop 246 attendant the translation of random noise signals through the gate 222. The output lead of the OR gate 222 is also connected to an oscillator and tone gate 252 and to the third input of the OR gate 244. The output lead of the OR gate 222 is normally deenergized but in response to energization of one of its input leads it develops a negative polarity output signal that is directly coupled to the OR gate 244 and which also resets the flip-flop 246 to provide a negative polarity signal at its output. The energized output of OR gate 222 also energizes the gate of block 252.

The tone oscillator and gate 252 is coupled to the operator headset 52 and is adapted upon actuation to provide a momentary audio tone to headset 52 informing the operator that he is about to be connected to a service requesting link. The operator communicates with the service requesting link through conventional audio circuits 254 that are connected between the headset 52 and the operator talk bus 48.

In explaining the operation of the answer circuit 42, it is initially assumed that the operator is communicating with one service requesting link and furthermore that the link coupled to the service request lead 54*a* is also in a service request condition. Thus, the lead 54*a* as well as the common service request bus 44 are in an energized condition. The signal on the bus 44 causes the lamp 46 to glow informing the operator that there is at least one more link still in a service request condition. The signal on bus 44 also inhibits the gate 238 while unblocking the gate 242 through the inverter 240. Although the input to the OR gate 244 from inverter 240 is at ground, the other two input leads of the OR gate are energized and, therefore, the clock 212 is stopped.

When the assumed initial call is satisfactorily completed, the operator depresses the queue advance switch 58 thereby communicating a signal pulse to one input of flip-flop 248 through the unblocked gate 242 to set the output of flip-flop 248 at a ground potential. Flip-flop 248 is already in this state under the assumed conditions, hence, the input signal pulse from gate 242 has no effect. Actuation of switch 58 also resets the flip-flop 246 to its normal or ground state to remove one of the remaining two negative inputs to the OR gate 244. The grounded output of flip-flop 246 is also coupled to all of the output networks of the M links. For reasons that will become more apparent hereinafter, the ground signal of flip-flop 246 results in a deenergization of the talk control lead of the link through which the operator has just completed a call, i.e., the output lead of the appropriate one of the M output networks. All of the inputs of the OR gate 222 are now deenergized and, therefore, the last remaining input to the following OR gate 244 is also grounded.

The clock 212 is now in a free running condition and increments the counter 210 to successively and individually ground the output leads of decoder 214. The OR gate 218 of the output network 215 is provided one input from one of the decoder output leads and two additional inputs from respectively flip-flop 248 and the inverter 226. It will be recalled that the output of flip-flop 248 is grounded and since the service request lead 54*a* is assumed to be energized, the input along this signal path to gate 218 is also at ground potential. Accordingly, when the decoder lead of OR gate 218 is sequenced to a ground potential, all three inputs of the OR gate 218 are concurrently at ground thereby providing through the inverter 220 a negative polarity energizing signal on the talk control lead 50*a* and the corresponding input of the OR gate 222.

It will be recognized that only one input of the OR gate 222, i.e., one talk control lead, is energized at any one time because only one output lead of the decoder 214 is deenergized at any one time. The energizing signal at the input of OR gate 222 is translated through this gate to provide a negative polarity input signal at the OR gate 244 to stop the clock 212 and prevent the decoder from being sequenced to another link. The signal communicate of the OR gate 222 also energizes the tone oscillator and gate 252 to provide a momentary audio tone to the headset 52 thereby informing the operator that he is now connected to a succeeding service requesting link, namely, the "link 1" (see FIG. 1) associated with leads 50*a*, 54*a*. In this regard, it will be recalled that energization of a talk control lead, such as the lead 50*a*, unblocks the circuit path between the operator talk bus 48 and the corresponding link. Thus, the operator is now enabled to orally communicate with the caller through the bilateral audio circuit 254 and the talk bus 48.

From the earlier discussion of the link 20 illustrated in FIG. 2, it will be recalled that upon completion of a call, the service request lamp 47 and the service request lead 54*a* of the link 20 are deenergized. To prevent this occurrence from causing the talk control lead 50*a* to in turn be deenergized by the electrical connection from the lead 54*a* through the OR gate 224, the inverter 226, the OR gate 218 and the inverter 220, it is necessary to provide a simulated service request within the answer circuit 42 to allow the operator to remain in the circuit until it is desired to withdraw from the completed call. To this end, a signal output of the OR gate 222 sets the output lead of the flip-flop 246 to a negative potential thereby to provide a simulated service request input to the OR gate 224 and to maintain the clock 212 in an off condition through the OR gate 244.

After the operator has satisfactorily extended the incoming call for the "link 1," the answer circuit is disconnected from this link by a second depression of the queue advance switch 58. More specifically, depression of switch 58 restores the output lead of the flip-flop 246 to ground to remove one energizing input of the gate 244 and to remove the simulated service request input to OR gate 224. Thus, the talk control lead 50*a* is deenergized through the series inverter 226, OR gate 218 and inverter 220. The output of the OR gate 222 is therefore deenergized and the center input of the gate 244 restored to ground potential.

Assuming that additional links are in a service request condition, the right-hand input of the OR gate 244 is likewise at ground potential due to the input from energized service request bus 44 through inverter 240. Thus, clock 212 is restored to a free running condition to increment the counter 210 by the three coincident ground potential signals at the inputs of OR gate 244. Since the inhibitor gates 238 and 242 are still in the blocked and unblocked conditions, respectively, that they were in on the prior depression of the queue advance switch 58, the momentary output signal of the queue advance switch 58 is again communicated to the flip-flop 248 through the unblocked inhibitor gate 242. Thus, the ground potential output of flip-flop 248 remains unaffected.

The counter decoder continues to sequence the links until a succeeding service requesting link is encountered; the operating sequence as above described is now repeated.

Assuming now, on the other hand, that no links are in a service request condition at the time the operator depresses the queue advance switch 58 to release from a completed call, it will be recognized that the inhibitor gate 238 is unblocked and the inhibitor gate 242 blocked. Thus, the momentary output pulse of the queue advance switch 58 is now passed by the inhibitor gate 238 instead of the inhibitor gate 242; accordingly the output lead of the flip-flop 248 is changed from ground to a negative polarity signal level. Thus, there can never be a coincidence of grounded inputs to the OR gate 218 or the corresponding OR gates of the remaining output networks until the flip-flop 248 is restored to a value. This means that on the next service request the operator must depress the queue advance switch 58 in order to condition the answer circuit to respond to that service request. Although the logic circuitry of the exemplary answer circuit is designed to operate with "on" and "off" signals corresponding to a predetermined negative and ground potential, respectively, it will be obvious to those skilled in the art that any other suitable logic levels as well as a variety of equivalent logic devices may be employed without in any sense departing from the invention. Furthermore, it will be recognized, for example, that the described operating mode of the queue advance switch 58 is not mandatory but may be altered to provide somewhat different operating features.

CONFERENCE LINK

Figures 6, 7:
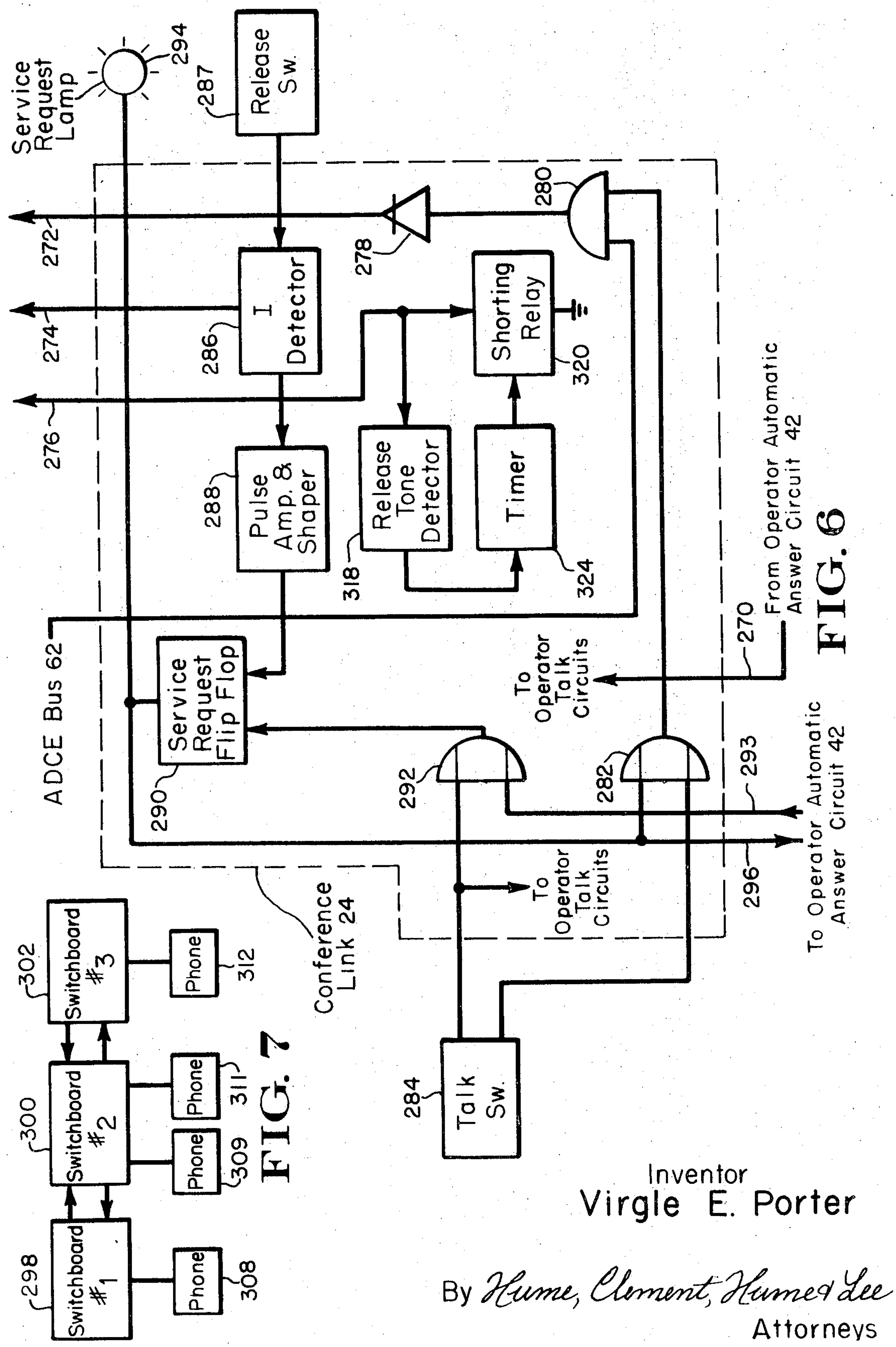
FIG. 6 is a logic block diagram of a preferred embodiment of the conference link of FIG. 1, illustrating only those portions of the conference link that are not identical to the link of FIG. 2.
FIG. 7 is a block diagram useful in explaining the operation of the circuit of FIG. 6.

Referring now to FIG. 6, there is illustrated the preferred embodiment of the conference link circuit 24 shown in block outline in FIG. 1. For convenience and clarity of explanation, much of the circuitry of the conference link that is identical to the ordinary link illustrated in FIG. 2 has been omitted from the drawing.

The conference link 24, like the remaining links of the switchboard, is connected to one vertical terminal of the crosspoint matrix 26. This vertical terminal comprises the usual three conductor leads, namely, a control lead 272, a hold current lead 274 and a talk path lead 276. The control lead 272 is normally deenergized, i.e., not signal marked, by virtue of its connection to the normally negative polarity output signal of an inverter 278.

The matrix control lead 272 is signal marked by application of concurrent signal inputs to an AND gate 280 which grounds lead 272 through the inverter 278. A first input of the AND gate 280 is taken from the ADCE bus 62 while the other input is received from the output lead of an OR gate 282. The OR gate 282 includes a pair of inputs from respectively a manual talk control station and the automatic answer circuit 42 to permit the operator to set up a conference according to either a manual or automatic mode of switchboard operation. More particularly, a first input is provided OR gate 282 from a manually actuable operator talk switch 284. Actuation of the talk switch 284 develops a first energizing input to the AND gate 280 which conditions the circuit to momentarily signal mark control lead 272 concurrently with each momentary energization of ADCE bus 62. It will be recalled, of course, that each depression of a line/trunk connect switch momentarily energizes bus 62 as well as the horizontal matrix control lead of that line/trunk. Thus, with the talk switch 284 in an "on" position, each depression of a line/trunk connect switch electrically interconnects the selected line/trunk and the conference link through the matrix 26. Three, or more parties may be connected to conference link 24 in the above manner.

The plurality of line/trunks are maintained in electrical interconnection with the conference link by virtue of the crosspoint hold current flowing in hold current lead 274. The lead 274 is connected to a hold current detector 286 of the conference link 24 which includes a suitable current source having a maximum available current output that is least equal to the total hold current required to sustain connection of the selected maximum number of conferees to the conference link. The detector 286 also receives an input from a release switch 287 that is adapted to open that portion of the hold current circuit within detector 286 and thereby concurrently release all of the conferees from the conference link 24.

It is desired in the present embodiment of the invention to provide a signal indication to the operator whenever any one or more of the conferees withdraws from the conference. The operator is instructed to access the conference link on each such occurrence to determine if any assistance is needed. To this end, the detector 286 includes means for sensing incremental decrements in holding current to develop a predetermined output signal pulse that is utilized in providing a visual signal indication to the operator. More specifically, this is accomplished by providing a transformer output stage for the current detector 286 such that a reduction in hold current in the primary winding of the transformer develops in conventional fashion a momentary pulse in the secondary winding. Alternatively, a resistor may be employed in place of the transformer if it is of a sufficiently low resistance as not to unduly load the hold current circuit. The output of the current detector 286 is connected by a pulse amplifier and shaper 288 to one input of a service request flip-flop 290. A signal pulse from block 288 sets the output of flip-flop 290 to an "on" state thereby energizing a service request lamp 294 of the conference link 24; the common service request lamp 46 (FIG. 1) of the automatic answer circuit 42 is also energized from a return lead 296 that is connected to the output of flip-flop 290. In this regard, it is presently preferred to have the conference link included in the scanning cycle of the scanner circuits of answer circuit 42 so that an automatic accessing of the conference link occurs, if desired. On the other hand, if the conference is set up by using the manual talk switch 284, the answer circuit is disengaged from the conference link so that one operator may automatically extend ordinary two-party calls while another operator manually sets up the conference. Of course, the allotter 40 does not allot the conference link but rather such is manually accomplished when a conference call is requested.

A second or reset input of the flip-flop 290 is received from an OR gate 292. The gate 292 includes a pair of inputs from respectively the talk switch 284 and a lead 293 of the operator answer circuit 42. Thus, when the operator responds to the service request either through the answer circuit 42 or the manual switch 284, the service request lamp 294 and the common service request lamp of circuit 42 are extinguished.

In many instances, it is desired to continue a conference after one or more of the conferees has withdrawn. However, but for special circuitry of the present invention, the release signal sent forward from a line/trunk upon a party hanging up may in certain instances cause one or more of the remaining conferees to be disconnected from the conference without their consent.

An illustration of one situation in which such an undesired disconnection would occur but for the invention may be considered by reference to FIG. 7. Specifically, in this FIG. there are illustrated three telephone switchboards 298, 300 and 302, respectively, each of which may be identical to the switchboard of FIG. 1. It is assumed that the four telephones 308—312 of the respective switchboards are connected in a conference call through a conference link of the switchboard 300. The switchboard 298 is, of course, connected to the switchboard 300 through one line/trunk of the latter board; the switchboard 300 is connected as an input to the switchboard 302 in like fashion.

Assuming now that the conferee on phone 308 hangs up, a release tone is set forward from the switchboard 298 to the incoming line/trunk of the board 300 and thence to the conference link of this board and out again to the line/trunk input of the board 302. The line/trunk input is connected through the matrix and a link of switchboard 302 to the line/trunk for the telephone 308. The release tone coupled to the line/trunk input of board 302 from the preceding switchboard circuitry is exactly equivalent to a release tone from a telephone directly connected to the aforesaid line/trunk input. From the earlier discussions herein, it will be recalled that when one party in a simple two-party call hangs up or rings-off the remaining phone, in this instance the phone 312, is automatically disconnected from the link.

According to the present invention, the conference link 24 includes circuitry for preventing a conferee, such as the party of phone 312, from being involuntarily disconnected from a conference. Specifically, the talk path lead 276 is connected in common to a release tone detector 318 and to a shorting relay 320. The detector 318 is coupled to the relay 320 by a timer 324. In operation, the detector 318 is adapted to respond to a release tone and develop an output pulse in a time significantly shorter than that in which any line/trunk is able to respond. Thus, the output pulse of the detector 318 results in the talk lead 276 being grounded by shorting relay 320 for a time interval determined by the timer 324. The timer 324 is set such that the talk lead is grounded for the remaining duration of the longest contemplated release tone. The release tone attendant any conferee withdrawing from the conference is therefore in all instances ineffective to release other conferees.

In explaining the operation of the conference link, it is initially assumed that the operator accesses the link and completes the call by use of the manual talk switch 284 as opposed to the automatic answer circuit 42. The operator sets up a conference between a selected number of line/trunk circuits as follows. The talk switch 284 is placed in an on position to enable one input of AND gate 280 through the OR gate 282. The connect switches of the desired line/trunks are then momentarily depressed in succession providing a corresponding succession of input signals on the ADCE bus 62 while concurrently signal marking the matrix control leads of the respective line/trunks. The succession of momentary input signals to the gate 280 from bus 62 are each effective to signal mark the vertical control lead 272 in a succession of short time intervals each of which intervals coincidence with the signal marking interval of a respective line/trunk circuit. Thus, each of the selected line/trunks is connected to the link 24 through the matrix 26.

Assuming now that one of the conferees withdraws from the conference, the reduction in matrix hold current sensed by the detector 286 results in a momentary pulse being applied to the amplifier and shaper 288 to set the flip-flop 290 to an on condition and energize service request lamp 294. The operator in due course responds to the visual indication of lamp 294 by actuating the talk switch 284 to communicated with the remaining conferees along operator talk circuitry (not shown in this FIG.). Actuation of talk switch 284 also resets flip-flop 290 to turn off the service request lamp 294. If all is in order, the operator withdraws from the conference by restoring the talk switch 284 to its normal or quiescent condition and the conference continues with a lesser number of parties. Of course, the operator may add one or more new parties to the conference, if requested.

The release tone developed in the line/trunk of the withdrawing conferee is precluded from involuntarily disconnecting any of the remaining conferees. Specifically, the tone detector 318 responds to the leading edge portion of the release tone to actuate the timer 324 and ground the talk lead 276 through the switch circuit 320. The timer 324 maintains the talk lead grounded for a period of time which exceeds the longest release tone anticipated.

While particular embodiments of the present invention have been shown and described, it is apparent that various changes and modifications may be made, and it is therefore intended in the following claims to cover all such modifications and changes as may fall within the true spirit and scope of this invention.

I claim:

1. In a telephone switchboard having a crosspoint matrix of horizontal and vertical terminal dimensions N by M, respectively, with the matrix crosspoint at the intersection of respective horizontal and vertical terminal pairs being adapted for effecting an electrical interconnection of said respective terminal pairs in response to coincident signal markings thereon and further having N line/trunk circuits and M normally idle link circuits coupled to individual ones of said horizontal and vertical terminals, respectively, of said matrix, the combination comprising:

allotter means for enabling an idle one of said M links to signal mark its associated vertical matrix terminal and for similarly enabling a successive idle link upon electrical connection of one of said N line/trunk circuits to said one link through said matrix;

seize circuit means, included within each of said line/trunk circuits, for developing a signal marking on said horizontal matrix terminal of a corresponding one of said line/trunk circuits in response to a predetermined input signal to said seize circuit means to effect said electrical interconnection of said one line/trunk circuit and said one link;

connect means adapted for developing a signal marking on a horizontal matrix terminal of another of said line/trunk circuits that is desired to be connected to said one line/trunk circuit; and control means, energized in response to said connected means, for effectively and temporarily disabling said allotter means and for concurrently reenabling only said one link to connect said another line/trunk circuit through said matrix to said one link and said one line/trunk circuit.

2. The invention according to claim 1 in which each of said M links includes detector means coupled to said allotter means and the associated vertical matrix terminal of said link and responsive to a signal indicative of closure of one crosspoint on said associated vertical terminal for causing said allotter means to thereafter effectively bypass said link until it is restored to an idle condition by the opening of all crosspoints on said associated vertical terminal.

3. The invention according to claim 2 in which each of said link circuits further includes service request means for providing a predetermined indication to a switchboard operator that a link is connected to only one of said N line/trunk circuits by said crosspoint matrix and access means for permitting said operator to access said connected line/trunk circuit to determine the identity of the line/trunk circuit desired to be reached by the party on said connected line/trunk circuit.

4. The invention according to claim 3 and further including ringback signal means responsive to actuation of said service request means for providing a ringback signal tone to said connected line/trunk circuit and further responsive to actuation of said access means for effectively removing said ringback tone from said connected line/trunk circuit.

5. The invention according to claim 4 in which said detector means of each link is responsive to a change in said signal, said change in said signal being caused by connection of a second line/trunk circuit to said link for disabling said service request means.

6. The invention according to claim 5 in which each of said line/trunk circuits includes call terminating means adapted for opening the matrix crosspoint connecting said line/trunk circuit and a respective one of said links in response to a predetermined input signal to said line/trunk circuit.

7. The invention according to claim 6 in which each of said links includes release means adapted for opening the matrix crosspoint connecting said link and one of said line/trunk circuits in response to said call terminating means of another of said line/trunk circuits opening a first crosspoint matrix connection between said same link and said another line/trunk circuit.

8. The invention according to claim 2 in which said allotter means includes a counter and decoder coupled to said M links and in which each of said links is adapted to be enabled in response to a respective predetermined output signal from said counter and decoder and further including a normally free running clock for incrementing said counter, said detector means of each of said links being adapted for disabling said clock when said respective output signal is applied to said link and said link is in an idle condition thereby to maintain said idle link in an enabled condition.

9. The invention according to claim 8 and further including link priority reserve means for effectively assigning a priority status to a predetermined number of said M links and for effectively preventing said allotter means from enabling any of said predetermined number of priority links until all of the remaining of said M links are in a busy condition.

10. The invention according to claim 9 and further including priority selector means adapted for establishing a priority status for a predetermined number of said N line/trunk circuits and in combination with said link priority reserve means being adapted for permitting only priority line/trunk circuits to be connected to said priority links.

11. The invention according to claim 10 and further including a nonpriority links busy bus coupled between said priority reserve means and each of said N line/trunk circuits adapted for effectively inhibiting operation of said seize circuit means within each of said respective line/trunk circuits only when all of the nonpriority status links are in a busy condition.

12. The invention according to claim 11 in which said priority selector means comprises inhibitor gate means interposed between said nonpriority links busy bus and each of said predetermined number of priority status line/trunk circuits for effectively disconnecting said nonpriority links busy bus from each of said priority status line/trunk circuits.

13. The invention according to claim 1 in which said connect means comprises a manually operable switch for each of said N line/trunk circuits, each of said switches being adapted for actuating said seize circuit means of its associated line/trunk circuit.

14. The invention according to claim 13 in which said control means comprises an allot disable connect enable bus coupled from each of said N line/trunk circuits to each of said M link circuits, said connect switches of each of said N line/trunk circuits being adapted to energize said allot disable connect enable bus for effectively and temporarily disabling said allotter means and for concurrently enabling only said one link to connect said another line/trunk circuit to said one link and said one line/trunk circuit.

15. The invention according to claim 14 and further including operator access means for permitting an operator to selectively and individually access each of said M links and an AND gate means for each of said links having a pair of inputs respectively from said allot disable connect enable bus and said operator access means for signal marking the vertical matrix terminal of said link upon concurrent energization of said allot disable connect enable bus and said operator access means.

16. The invention according to claim 15 and further comprising priority call indicator means including individual priority lamp indicator apparatus for each of said N line/trunk circuits and responsive to a control signal of a first predetermined polarity on the horizontal matrix terminal associated with said line/trunk circuit for visually indicating a priority call status, said priority call indicator means further comprising selectively actuable priority switch apparatus associated with predetermined ones of said M links for developing a control signal bias of said first predetermined polarity on the vertical matrix terminal of said link to energize said lamp indicators of all of said line/trunk circuits coupled to said link through said matrix.

17. The invention according to claim 16 and further including release means for deenergizing said priority switch apparatus of said priority call indicator means upon disconnect of said line/trunk circuits from said link.

18. The invention according to claim 17 and further comprising link locate means including individual lamp indicator apparatus for each of said M link circuits and responsive to a control signal bias of a second polarity, opposite to that of said first predetermined polarity, on the vertical matrix terminal associated with said link for providing a visual signal indication, said link locate means further comprising selectively actuable link locate switch apparatus for each of said line/trunk circuits for developing said second control signal bias to energize, through said crosspoint matrix, said lamp indicator of the one of said M links to which a predetermined one of said line/trunk circuits is connected.

19. The invention according to claim 18 in which said second control signal bias of said link locate means is adapted to temporarily overwhelm said first control signal bias of said priority call indicator means.

20. The invention according to claim 19 and further comprising preempt means selectively adapted for conditioning said link locate switch apparatus of predetermined ones of said N line/trunk circuits to operate to open a matrix crosspoint interconnecting a selected one of said line/trunk circuits and one of said M links.

21. The invention according to claim 7 and further including busy lamp means for each of said N line/trunk circuits for visually denoting that a corresponding line/trunk circuit is connected through said matrix to one of said M link circuits.

22. The invention according to claim 21 in which said seize circuit means is adapted to respond to a magnetotype signal input wherein a user provides a momentary ring-on signal indication for actuating said seize circuit means to connect said line/trunk circuit to said one link and a momentary ring-off signal for disconnecting said line/trunk circuit from said one link and further including bistable memory means for maintaining said busy lamp in a busy indicating condition independently of continued connection of said line/trunk circuit to said one link at the termination of a call between said line/trunk circuit and another line/trunk circuit to define an artificial busy condition but only until a ring-off signal is provided to said seize circuit means.

23. The invention according to claim 22 and further including gate means interposed between said bistable memory means and said link locate switch apparatus of each of said line/trunk circuits, said gate mans being adapted to enable said link locate switch apparatus to actuate said bistable memory means and clear said artificial busy condition while inhibiting actuation of said bistable memory means by said link locate switch apparatus when said line/trunk is connected to said one link through said matrix.

24. In a telephone switchboard including N line/trunk circuits, M links and a crosspoint matrix adapted, in combination with respective ones of said M links, for interconnecting selected predetermined pairs of said N line/trunk circuits along electrically conductive talk paths, the combination comprising:

first signalling means coupled to selected ones of said M links and adapted for developing an electrical control signal bias of a first predetermined polarity on the talk path interconnecting a predetermined pair of said N line/trunk circuits; and first indicator means coupled to selected ones of said line/trunk circuits and responsive to the presence of said electrical control signal bias of said first predetermined polarity on said talk path for developing a first predetermined signal indication.

25. The invention according to claim 24 and further comprising:

second signalling means, coupled to selected ones of said N line/trunk circuits and adapted for developing an electrical control signal bias of a second polarity, opposite to that of said first polarity, on the talk path interconnecting a predetermined pair of said N line/trunk circuits, said second signalling means being adapted to effectively override said first signalling means; and second indicator means coupled to selected ones of said links and responsive to said electrical signal bias of said second polarity for providing a second predetermined signal indication.

26. The invention according to claim 25 in which said first signalling means comprises a manually operable call priority switch for each of said selected links and said first indicator means comprises individual call priority indicator lamps for each of said selected line/trunk circuits.

27. The invention according to claim 26 and further comprising release means within each of said selected links for opening the crosspoint matrix interconnection between one of said pair of line/trunk circuits and said respective link in response to opening of the crosspoint matrix connection between the other of said pair of line/trunk circuits and said respective link and for concurrently restoring said first signalling means to a quiescent condition.

28. The invention according to claim 27 in which said second signalling means comprises a manually operable link locate switch for each of said selected line/trunk circuits and in which said second indicator means includes a link locate lamp for each of said selected links.

29. The invention according to claim 28 and further including preempt means adapted for enabling said second signalling means to operate to release the connection between its associated line/trunk circuit and the other of said pair of line/trunk circuits.

30. In a telephone switchboard of the type including a plurality of line/trunk circuits and interconnect means responsive to a first momentary input signal from a first one of said line/trunk circuits for connecting said first line/trunk circuit to said interconnect means along an electrically conductive talk path and for enabling a second line/trunk circuit to be connected to said first line/trunk circuit along an electrically conductive talk path and further responsive to a second momentary input signal from either of said first and second line/trunk circuits for opening the connection between said first and second line/trunk circuits and said interconnect means, respectively, and further including busy lamp means within each of said line/trunk circuits for visually denoting whether a line/trunk circuit is connected to said interconnect means, the improvement comprising:

means including a bistable memory device within each of said line/trunk circuits and responsive to said first and said second momentary input signals for maintaining said busy lamp in a busy indicating condition subsequent to said first momentary input signal and independently of connection of said line/trunk circuit to said interconnect means and for extinguishing said busy lamp indication only on application of said second momentary input signal to said line/trunk circuit.

31. The invention according to claim 30 and further including manually operable switch means coupled to said bistable memory device and adapted for extinguishing said busy lamp indication only when said line/trunk circuit is disconnected from said interconnect means.

32. In a telephone switchboard comprising N line/trunk circuits, a conference link and a crosspoint matrix having N horizontal terminals coupled to respective ones of said line/trunk circuits and a vertical terminal coupled to said conference link and being adapted to effect an electrical interconnection between ones of said horizontal terminals and said vertical terminal in response to coincident signal markings thereon and in which a predetermined electrical hold current, proportional in value to the number of said line/trunk circuits coupled to said conference link, flows in said vertical terminal, the combination comprising:

means for signal marking the horizontal terminal of a predetermined member of said line/trunk circuits;

conference call means for signal marking said vertical terminal concurrently with respective ones of said predetermined number of horizontal line/trunk terminals for effecting an electrical interconnection through said matrix of said predetermined number of line/trunk circuits and said conference link;

operator signalling means within said conference link and responsive to a predetermined input signal for developing an operator signalling indication;

call terminating means within each of said predetermined number of line/trunk circuits and responsive to a predetermined input signal thereto for releasing said line/trunk circuit from said conference link; and hold current detector means included within said conference link and responsive to a predetermined change in said hold current upon release of one of said predetermined number of line/trunk circuits for actuating said operator signalling means.

33. The invention according to claim 32 and further including operator access means for permitting said operator to access the remaining of said predetermined number of line/trunk circuits connected to said conference link and for restoring said operator signalling means to a quiescent condition.

34. The invention according to claim 33 in which said hold current detector is responsive to decrements in said holding current independently of the absolute value thereof.

35. The invention according to claim 34 in which said call terminating means develops an output signal tone of predetermined time duration on its associated horizontal matrix terminal and in which said conference link includes means responsive to the initial portion of said output signal for effectively isolating the remaining of said predetermined number of said line/trunk circuits from the remaining portion of said output signal.

36. In a telephone switchboard of the type having N line/trunk circuits, M link circuits and a crosspoint matrix of horizontal and vertical terminal dimensions N by M coupled, respectively, to individual ones of said N line/trunk circuits and said M link circuits and further having an allotter for enabling an idle one of said M links to be connected through said matrix to one of said line/trunk circuits upon application of a predetermined input signal to said one line/trunk circuit and for similarly enabling a successive idle link upon connection of said one line/trunk circuit to said one link, the combination comprising:

priority selector means coupled to a predetermined number of said N line/trunk circuits for effectively assigning a priority status to preselected ones of said line/trunk circuits; and link priority reserve means including apparatus for effectively assigning a priority status to a predetermined number of said links and for preventing said allotter from enabling any of said predetermined number of priority links until the remaining of said M links are all in a busy condition, said priority reserve means in combination with said priority selector means of said preselected line/trunk circuits being adapted for connection only priority status line/trunk circuits to said priority links.

37. The invention according to claim 36 and further including an all nonpriority links busy bus having a first predetermined output signal when all of said nonpriority links are in a busy condition and a second predetermined output signal when at least one of said nonpriority links is idle and in which said link priority reserve means includes a first manually operable switch adapted for respectively opening and closing a connection between an associated one of said links and said busy bus to effectively establish respectively a priority and a nonpriority status for said link and a second manually operable switch, ganged for operation with said first switch, adapted for respectively closing and opening a connection between said nonpriority links busy bus and said allotter for preventing, when said second switch is in a closed position, said allotter from enabling any of said priority links until all of said nonpriority links are in a busy condition.

38. The invention according to claim 37 and further comprising seize circuit means, included within each of said line/trunk circuits, adapted for developing a predetermined output signal to connect said line/trunk circuit to an enabled one of said links and responsive to an all nonpriority links busy input signal from said busy bus for effectively precluding development of said predetermined output signal, and in which said priority selector means includes, for each of said preselected line/trunk circuits, manually operable switch apparatus having a priority and a nonpriority switch position, respectively, and an inhibitor gate having a first input and an output coupled respectively to said nonpriority links busy bus and said seize circuit means and a second input coupled to said manually operable switch apparatus and adapted for inhibiting translation of a signal between said first input and said output when said manually operable switch apparatus is in said priority position.

39. In a telephone switchboard of the type having N line/trunk circuits and having M normally idle link circuits each adapted to develop a service request signal upon connection of a first one of said N line/trunk circuits thereto and further having allotter means for enabling a first idle one of said links to be connected to one of said line/trunk circuits and for similarly enabling a successive idle link upon connection of said one line/trunk circuit to said first enabled link, the combination comprising:

operator access means adapted, upon connection to a one of said service requesting links for permitting an operator to interrogate said one line/trunk circuit coupled to said one service requesting link; and service request queueing means adapted for connection said operator access means in succession to individual ones of said service requesting links.

40. The invention according to claim 39 in which said queueing means includes link scanning apparatus for cyclically scanning each of said M links, said scanning apparatus being effectively disabled upon encountering a one of said service requesting links for connecting said queueing means to said one link requesting service.

41. The invention according to claim 40 in which said queueing means includes a manually actuable queue advance switch adapted, upon connection of said queueing means to one of said links requesting service, for connecting said operator access means to said service requesting link.

42. The invention according to claim 41 and further including common service request indicator means for all of said M links for providing an output signal indication when at least one of said M links remains in a service requesting condition.

43. The invention according to claim 42 in which said link service request is extinguished by connection of said queueing means thereto an ! in which said queueing means further includes signal simulating apparatus providing a simulated service request signal to said link scanning apparatus for maintaining said scanning apparatus in said disabled condition.

44. The invention according to claim 43 in which said queue advance switch is further adapted for effectively disabling said service request signal simulating apparatus to disconnect said queueing means from said one link and for reenabling said scanning apparatus to seek a second service requesting link.

45. The invention according to claim 44 in which said queueing means includes indicator apparatus, responsive to actuation of said queue advance switch to connect said operator access means to one of said service requesting links, for providing a momentary signalling indication to the switchboard operator.

46. The invention according to claim 3 and further comprising:

first signalling means coupled to selected ones of said M link circuits and adapted for developing an electrical control signal bias of a first predetermined polarity on a talk path interconnecting a predetermined pair of said N line/trunk circuits;

first indicator means coupled to selected ones of said line/trunk circuits and responsive to the presence of said electrical control signal bias of said first predetermined polarity on said talk path for developing a first predetermined signal indication;

second signalling means, coupled to selected ones of said N line/trunk circuits and adapted for developing an electrical control signal bias of a second polarity, opposite to that of said first polarity, on said talk path interconnecting a predetermined pair of said N line/trunk circuits, said second signalling means being adapted to effectively override said first signalling means; and second indicator means coupled to selected ones of said links and responsive to said electrical signal bias of said second polarity for providing a second predetermined signal indication.

47. The invention according to claim 3 wherein said connect means is responsive to a first momentary input signal from a first one of said line/trunk circuits for connecting said first line/trunk circuit to said connect means along an electrically conductive talk path and for enabling a second line/trunk circuit to be connected to said first line/trunk circuit along an electrically conductive talk path and further responsive to a second momentary input signal from either of said first and second line/trunk circuits for opening the connection between said first and second line/trunk circuits and said connect means, respectively, and further including busy lamp means within each of said line/trunk circuits for visually denoting whether a line/trunk circuit is connected to said interconnect means, and further comprising:

means including a bistable memory device within each of said line/trunk circuits and responsive to said first and said second momentary input signals for maintaining said busy lamp in a busy indicating condition subsequent to said first momentary input signal and independently of connection of said line/trunk circuit to said connect means and for extinguishing said busy lamp indication only on application of said second momentary input signal to said line/trunk circuit; and manually operable switch means coupled to said bistable memory device and adapted for extinguishing said busy lamp indication only when said line/trunk circuit is disconnected from said connect means.

48. The invention according to claim 3 further comprising:

operator access means adapted, upon connection to a one of said service requesting links for permitting an operator to interrogate said one line/trunk circuit coupled to said one service requesting link; and service request queueing means adapted for connecting said operator access means in succession to individual ones of said service requesting links, said queueing means including link scanning apparatus for cyclically scanning each of said M links, said scanning apparatus being effectively disabled upon encountering a one of said service requesting links for connecting said queueing means to said one link requesting service.

49. The invention according to claim 3 further comprising:

a conference link and a crosspoint matrix having N horizontal terminals coupled to respective ones of said N line/trunk circuits and a vertical terminal coupled to said conference link and being adapted to effect an electrical interconnection between ones of said horizontal terminals and said vertical terminal in response to coincident signal markings thereon and in which a predetermined electrical hold current, proportional in value to the number of said line/trunk circuits coupled to said conference link, flows in said vertical terminal;

means for signal marking the horizontal terminal of a predetermined member of said line/trunk circuits;

conference call means for signal marking said vertical terminal concurrently with respective ones of said predetermined number of horizontal line/trunk terminals for effecting an electrical interconnection through said matrix of said predetermined number of line/trunk circuits and said conference link;

operator signalling means within said conference link and responsive to a predetermined input signal for developing an operator signalling indication;

call terminating means within each of said predetermined number of line/trunk circuits and responsive to a predetermined input signal thereto for releasing said line/trunk circuit from said conference link; and hold current detector means included within said conference link and responsive to a predetermined change in said hold current upon release of one of said predetermined number of line/trunk circuits for actuating said operator signalling means.

50. The invention according to claim 3 and further comprising:

priority selector means coupled to a predetermined number of said N line/trunk circuits for effectively assigning a priority status to preselected ones of said line/trunk circuits;

link priority reserve means including apparatus for effectively assigning a priority status to a predetermined number of said links and for preventing said allotter from enabling any of said predetermined number of priority links until the remaining of said M links are all in a busy condition, said priority reserve means in combination with said priority selector means of said preselected line/trunk circuits being adapted for connecting only priority status line/trunk circuits to said priority links; and an all nonpriority links busy bus having a first predetermined output signal when all of said nonpriority links are in a busy condition and a second predetermined output signal when at least one of said nonpriority links is idle and in which said link priority reserve means includes a first manually operable switch adapted for respectively opening and closing a connection between an associated one of said links and said busy bus to effectively establish respectively a priority and a nonpriority status for said link and a second manually operable switch, ganged for operation with said first switch, adapted for respectively closing and opening a connection between said nonpriority links busy bus and said allotter for preventing, when said second switch is in a closed position, said allotter from enabling any of said priority links until all of said nonpriority links are in a busy condition.

51. The invention according to claim 50 wherein said priority selector means comprises:

first signalling means coupled to selected ones of said M link circuits and adapted for developing an electrical control signal bias of a first predetermined polarity on a talk path interconnecting a predetermined pair of said N line/trunk circuits; and first indicator means coupled to selected ones of said line/trunk circuits and responsive to the presence of said electrical control signal bias of said first predetermined polarity on said talk path for developing a first predetermined signal indication.

52. The invention according to claim 51 further comprising:

second signalling means, coupled to selected ones of said N line/trunk circuits and adapted for developing an electrical control signal bias of a second polarity, opposite to that of said first polarity, on said talk path interconnecting a predetermined pair of said N line/trunk circuits, said second signalling means being adapted to effectively override said first signalling means; and second indicator means coupled to selected ones of said links and responsive to said electrical signal bias of said second polarity for providing a second predetermined signal indication.

53. The invention according to claim 52 further comprising:

operator access means adapted, upon connection to a one of said service requesting links for permitting an operator to interrogate said one line/trunk circuit coupled to said one service requesting link; and service request queueing means adapted for connecting said operator access means in succession to individual ones of said service requesting links, said queueing means including link scanning apparatus for cyclically scanning each of said M links, said scanning apparatus being effectively disabled upon encountering a one of said service requesting links for connecting said queueing means to said one link requesting service.

54. The invention according to claim 53 and further comprising:

a conference link and a crosspoint matrix having N horizontal terminals coupled to respective ones of said N line/trunk circuits and a vertical terminal coupled to said conference link and being adapted to effect an electrical interconnection between ones of said horizontal terminals and said vertical terminal in response to coincident signal markings thereon and in which a predetermined electrical hold current, proportional in value to the number of said line/trunk circuits coupled to said conference link, flows in said vertical terminal;

means for signal marking the horizontal terminal of a predetermined member of said line/trunk circuits;

conference call means for signal marking said vertical terminal concurrently with respective ones of said predetermined number of horizontal line/trunk terminals for effecting an electrical interconnection through said matrix of said predetermined number of line/trunk circuits and said conference link;

operator signalling means within said conference link and responsive to a predetermined input signal for developing an operator signalling indication;

call terminating means within each of said predetermined number of line/trunk circuits and responsive to a predetermined input signal thereto for releasing said line/trunk circuit from said conference link; and hold current detector means included within said conference link and responsive to a predetermined change in said hold current upon release of one of said predetermined number of line/trunk circuits for actuating said operator signalling means.

55. The invention according to claim 54 and further comprising:

busy lamp means for each of said N line/trunk circuits for visually denoting that a corresponding line/trunk circuit is connected through said matrix to one of said M link circuits, and wherein said seize circuit means is adapted to respond to a magnetotype signal input wherein a user provides a momentary ring-on signal indication for actuating said seize circuit means to connect said line/trunk circuit to said one link and a momentary ring-off signal for disconnecting said line/trunk circuit from said one link;

bistable memory means for maintaining said busy lamp in a busy indicating condition independently of continued connection of said line/trunk circuit to said one link at the termination of a call between said line/trunk circuit and another line/trunk circuit to define an artificial busy condition but only until a ring-off signal is provided to said seize circuit means; and gate means interposed between said bistable memory means and said link locate switch apparatus of each of said line/trunk circuits, said gate means being adapted to enable said link locate switch apparatus to actuate said bistable memory means and clear said artificial busy condition while inhibiting actuation of said bistable memory means by said link locate switch apparatus when said line/trunk is connected to said one link through said matrix.

PO-1050
(5/69)

UNITED STATES PATENT OFFICE
CERTIFICATE OF CORRECTION

Patent No. 3,557,317 Dated January 19, 1971

Inventor(s) VIRGLE E. PORTER

It is certified that error appears in the above-identified patent and that said Letters Patent are hereby corrected as shown below:

Column 5, line 6, "hole" should read --hold--.

Column 11, line 44, after "vertical" insert --talk--.

Column 12, line 64, "manual" should read --manually--.

Column 20, line 56, "shutoff" should read --shut off--.

Column 22, line 14, "communicate" should read --output--.

Column 25, line 40, "communicated" should read --communic

Column 26, line 17, "connected" should read --connect--.

Column 28, line 31, "mans" should read --means--.

Column 30, line 40, "connection" should read --connecting

Column 31, line 14, "connection" should read --connecting

Signed and sealed this 29th day of June 1971.

(SEAL)
Attest:

EDWARD M.FLETCHER,JR.
Attesting Officer

WILLIAM E. SCHUYLER, JR
Commissioner of Patents